Nov. 27, 1962    R. A. BURGY ET AL    3,065,824
ELEVATOR CONTROLS
Filed Oct. 16, 1959    11 Sheets-Sheet 1
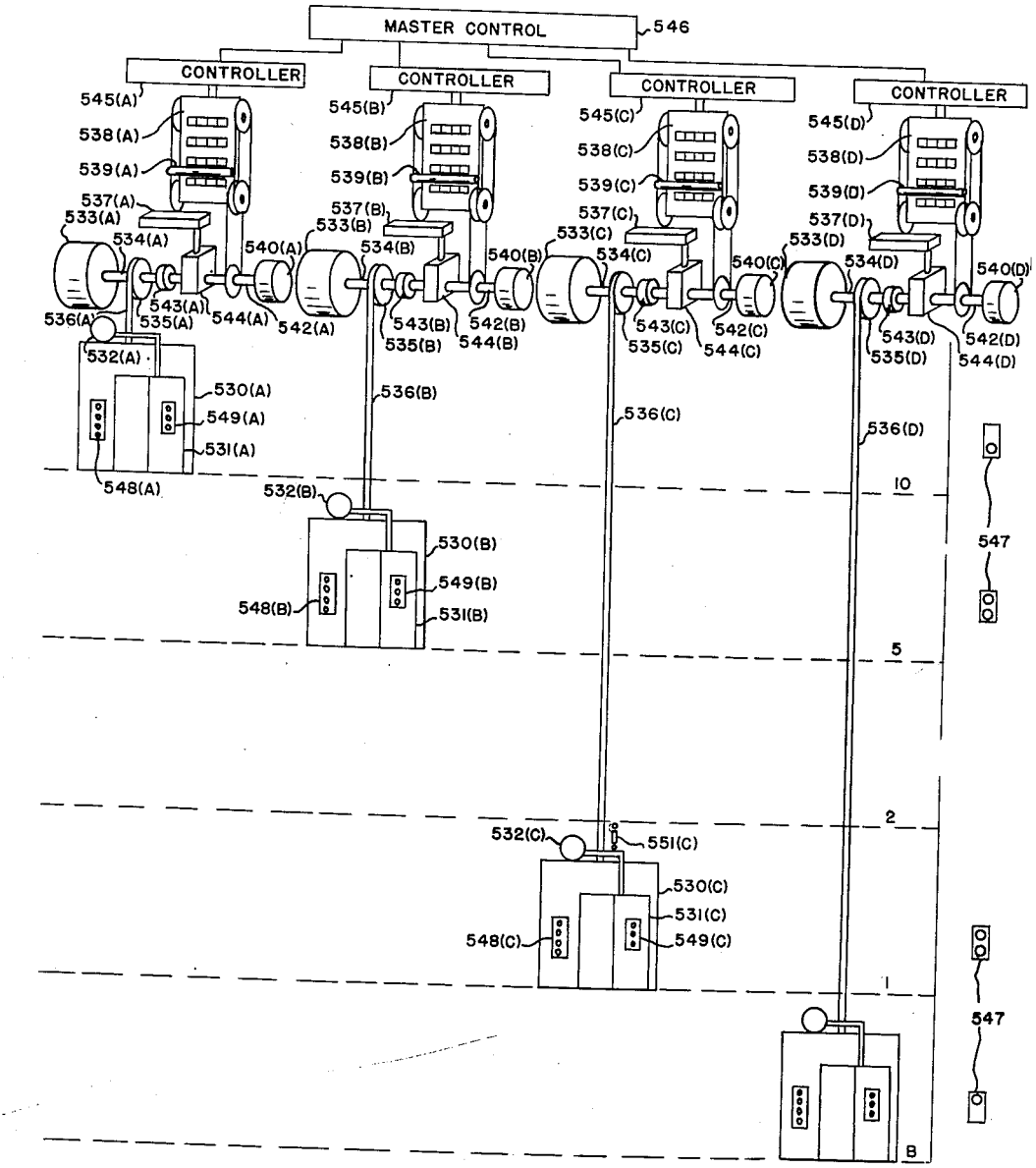
Fig. I
INVENTORS
RAYMOND A. BURGY
PAUL F. DeLAMATER
BY
Marshall, Marshall & Yeasting
ATTORNEYS

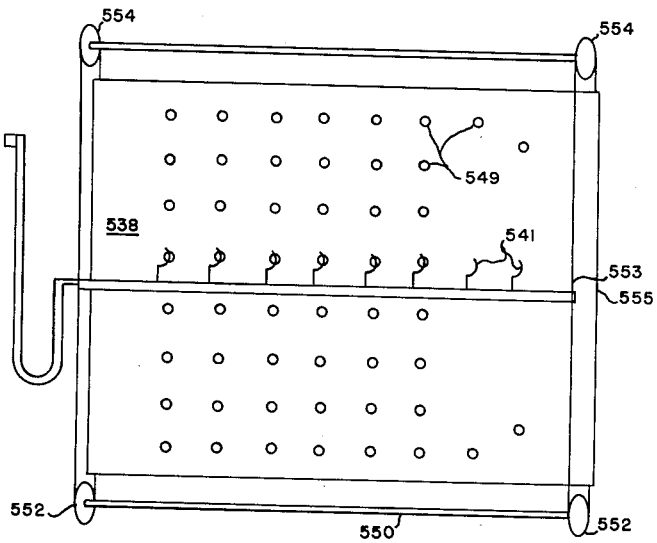
Fig. II
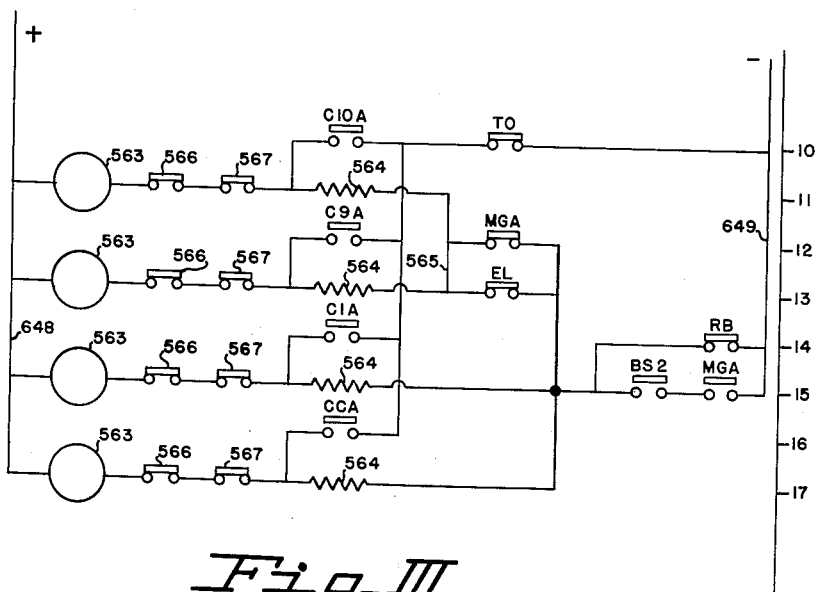
Fig. III

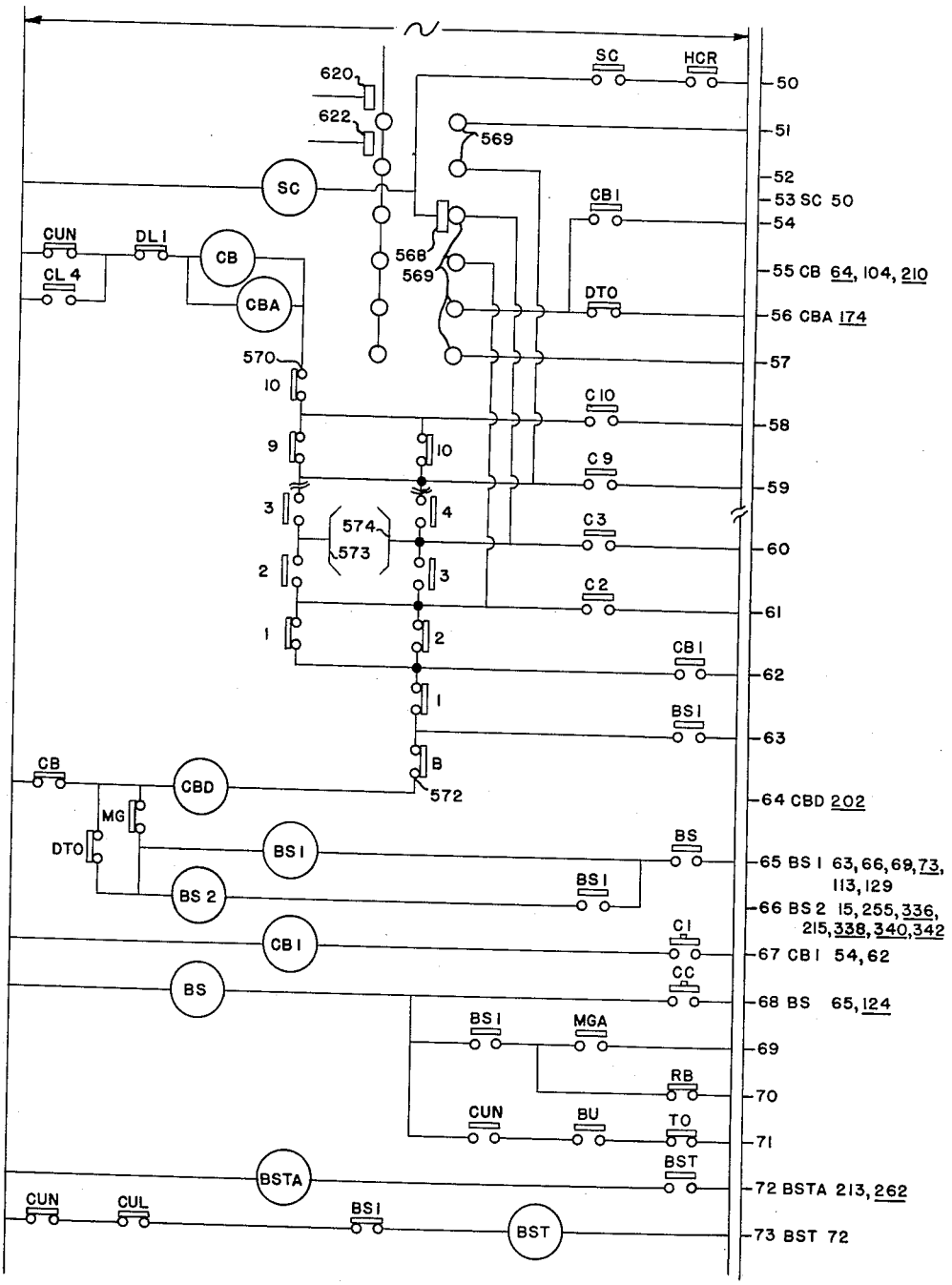
Fig. IV

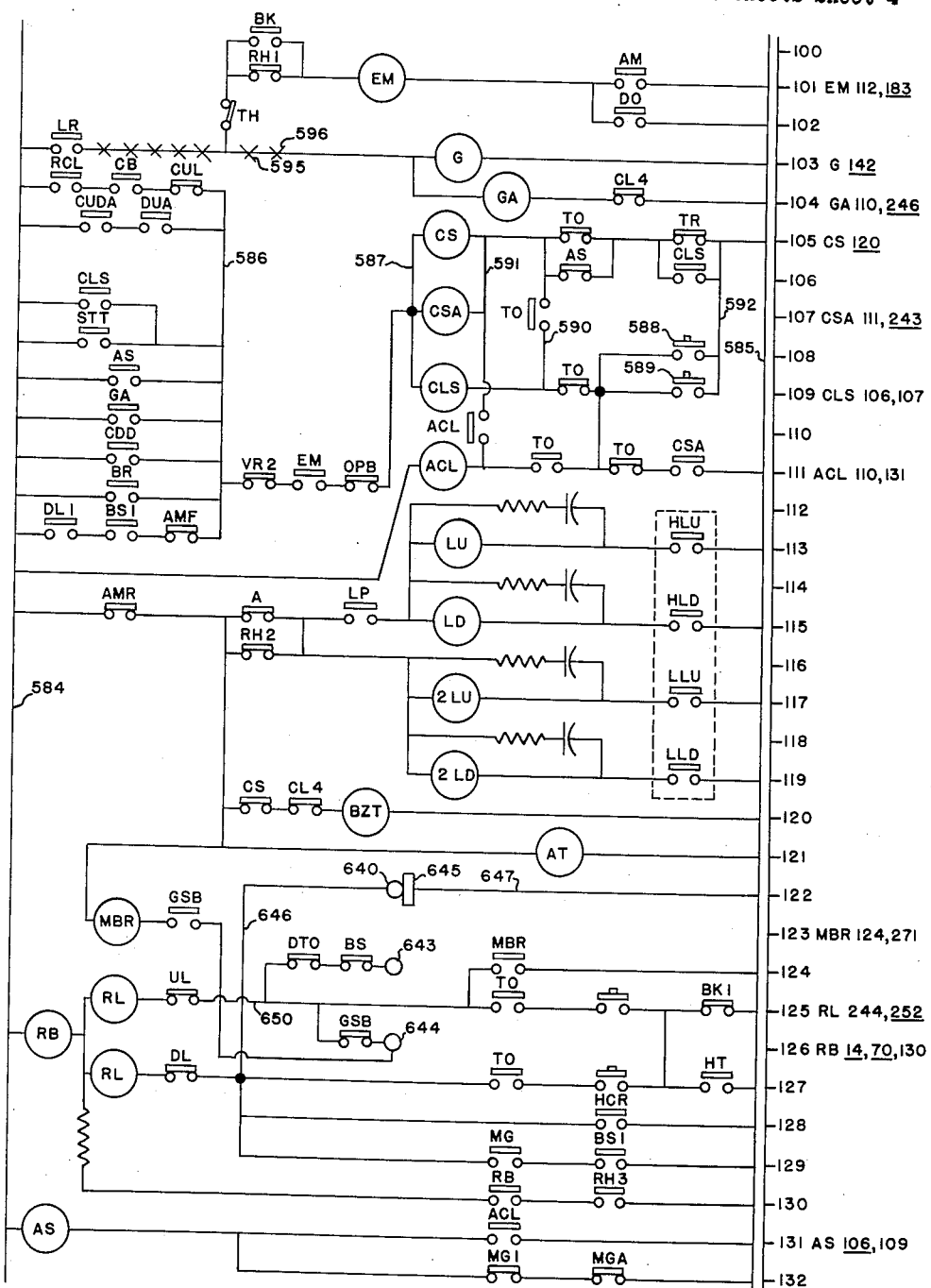
Fig. V

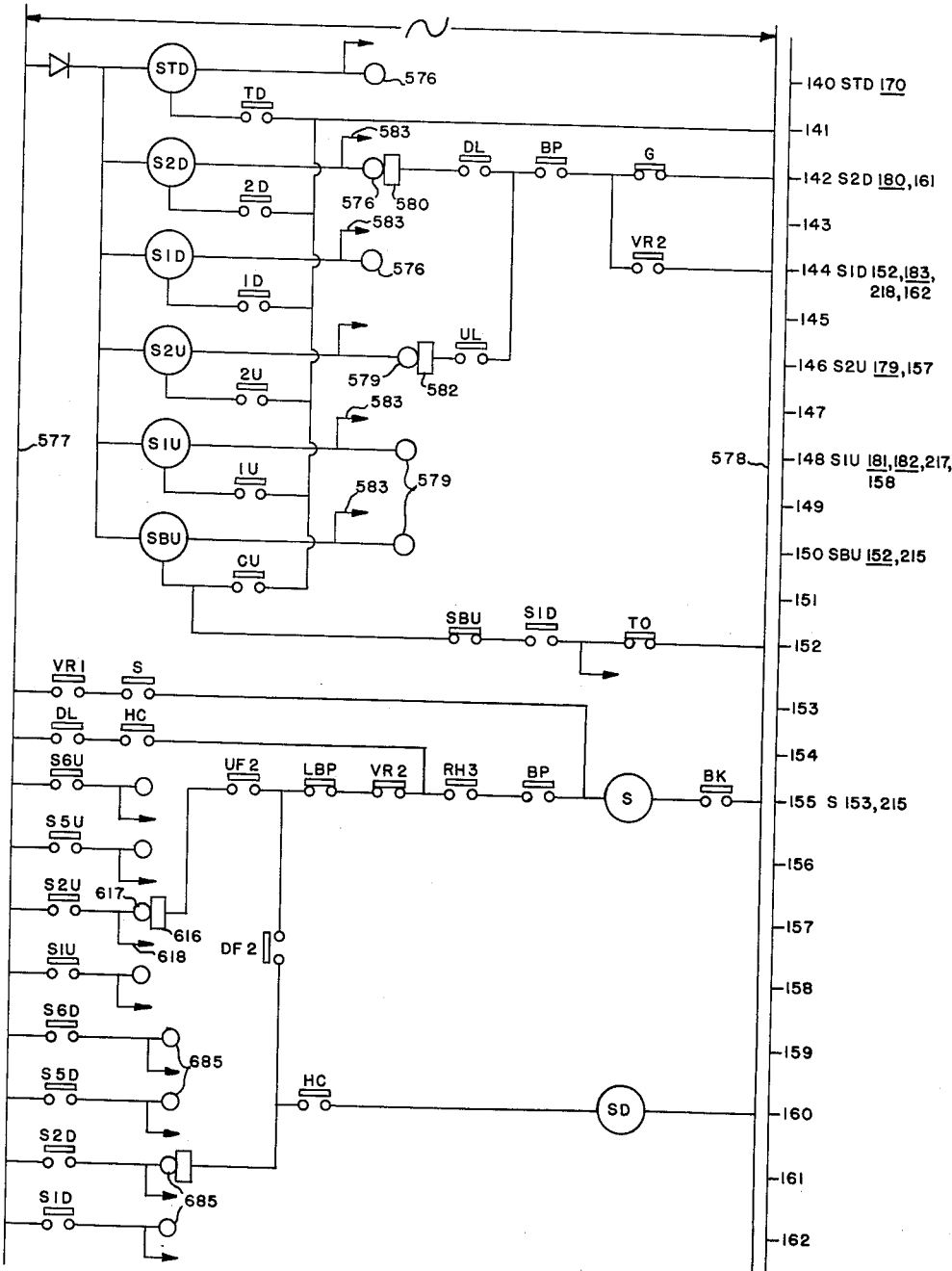
Fig. VI

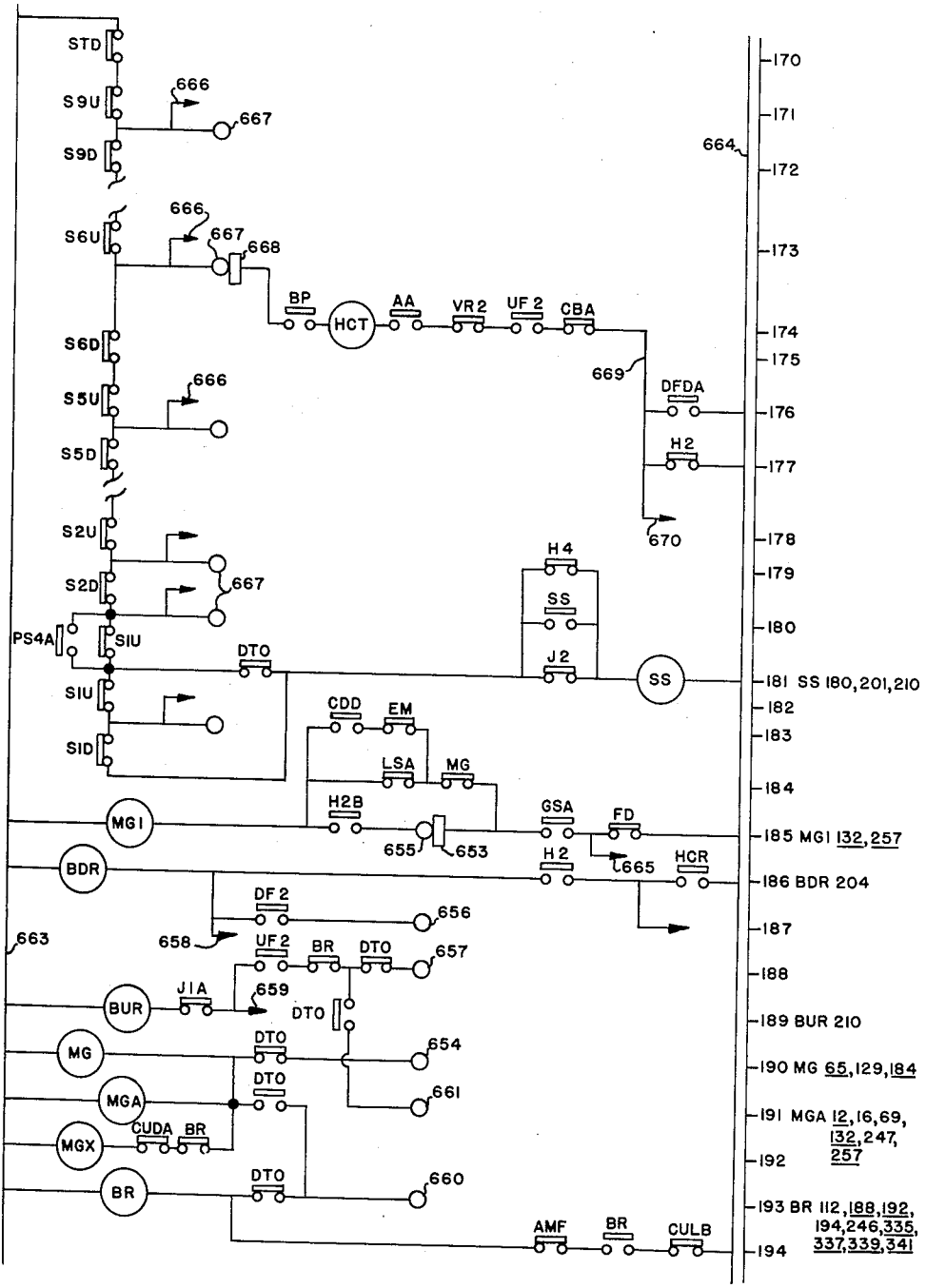
Fig. VII
INVENTORS
RAYMOND A. BURGY
PAUL F. DeLAMATER
BY
Marshall, Marshall & Yeasting
ATTORNEYS Nov. 27, 1962    R. A. BURGY ET AL    3,065,824
ELEVATOR CONTROLS
Filed Oct. 16, 1959    11 Sheets-Sheet 7
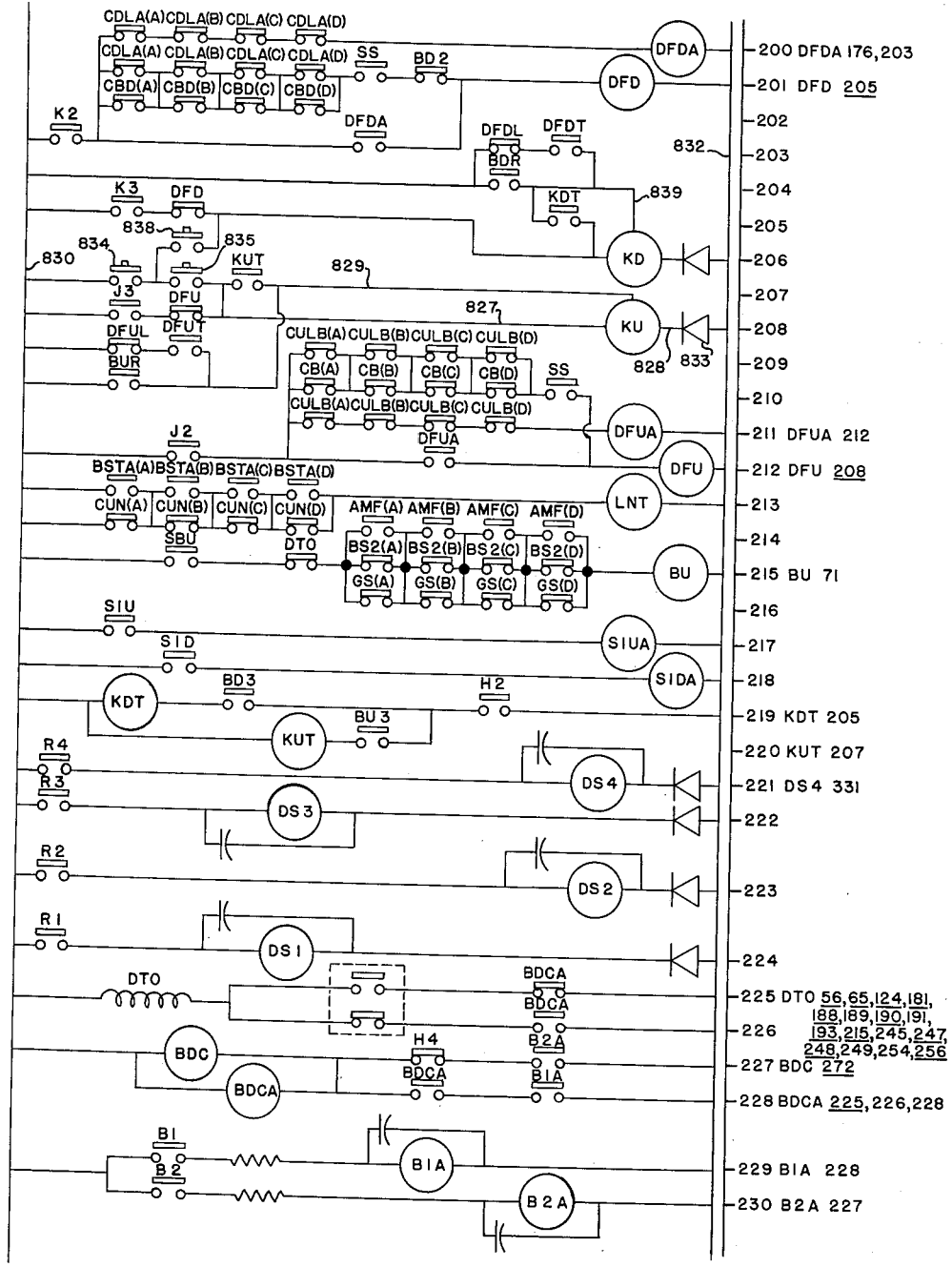
Fig. VIII
INVENTORS
RAYMOND A. BURGY
PAUL F. DeLAMATER
BY
Marshall, Marshall & Yeasting
ATTORNEYS

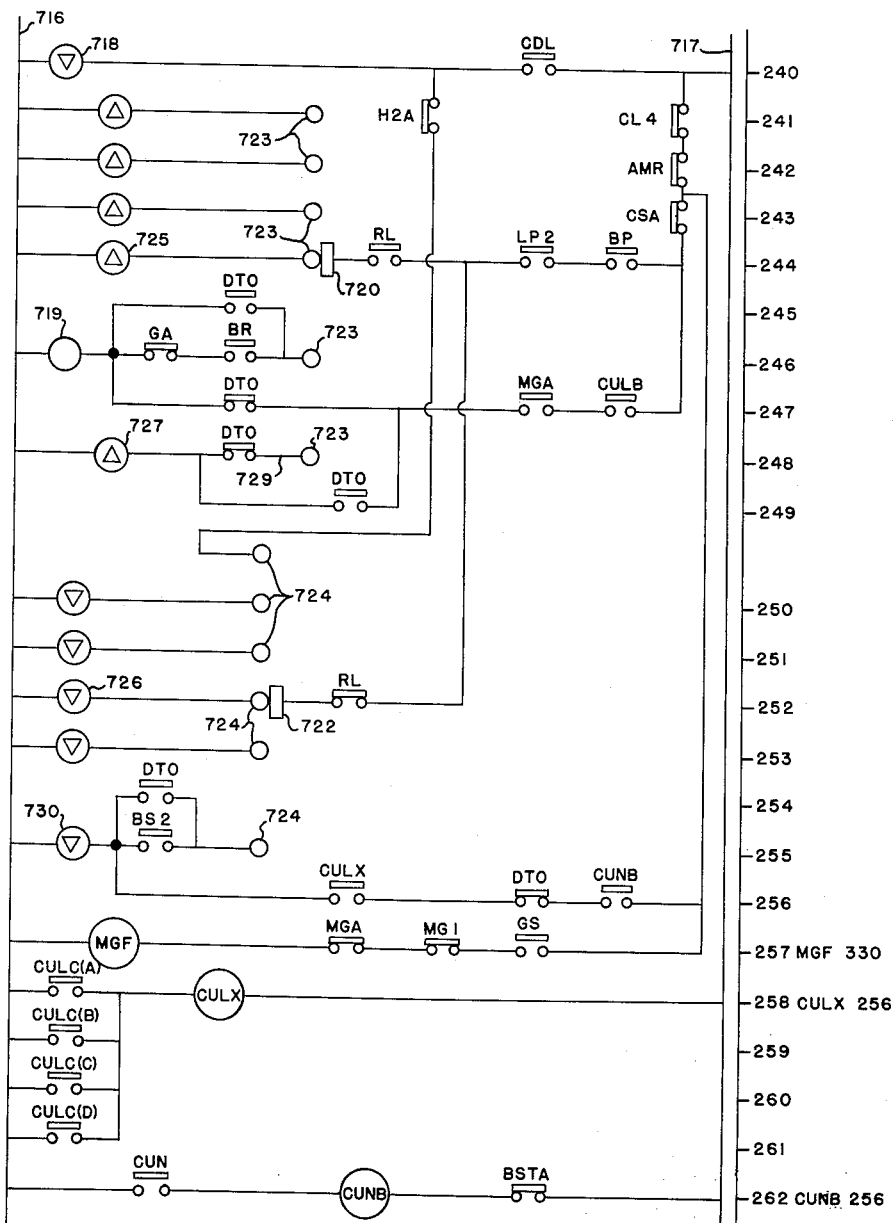
Fig-IX

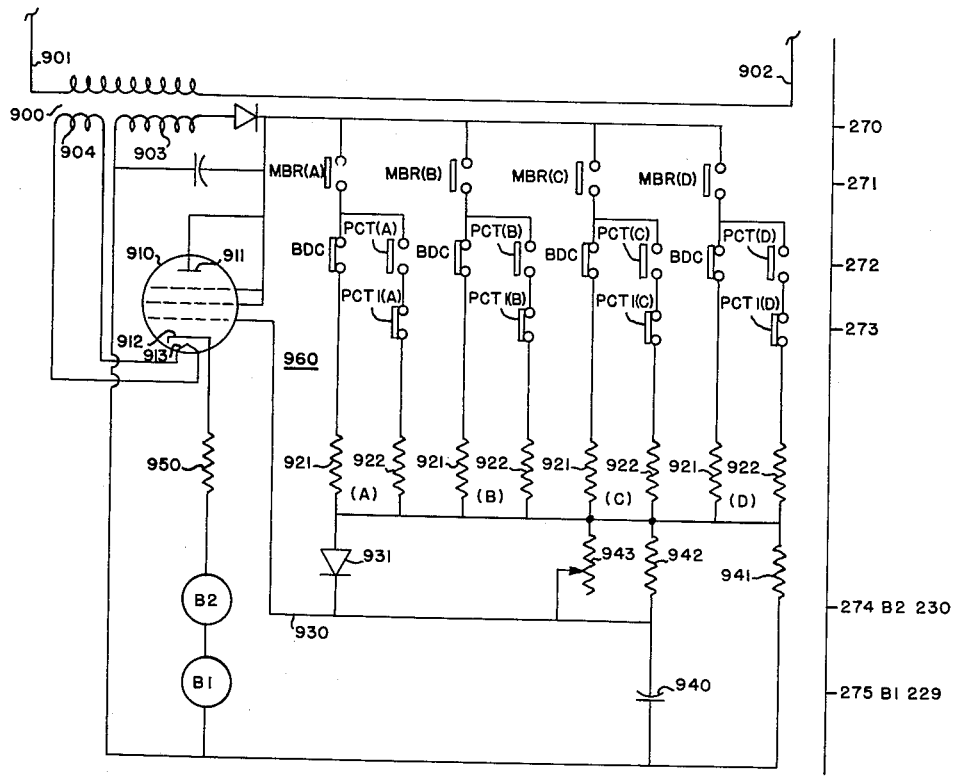
Fig. X

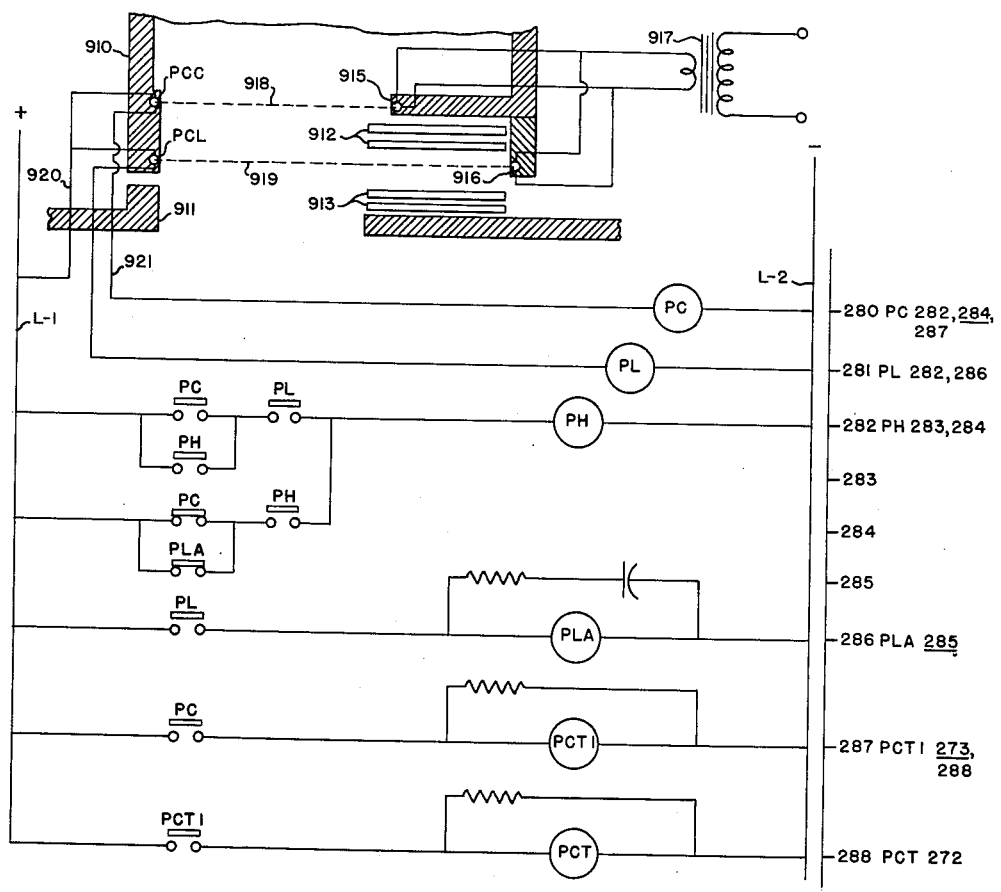
Fig. XI

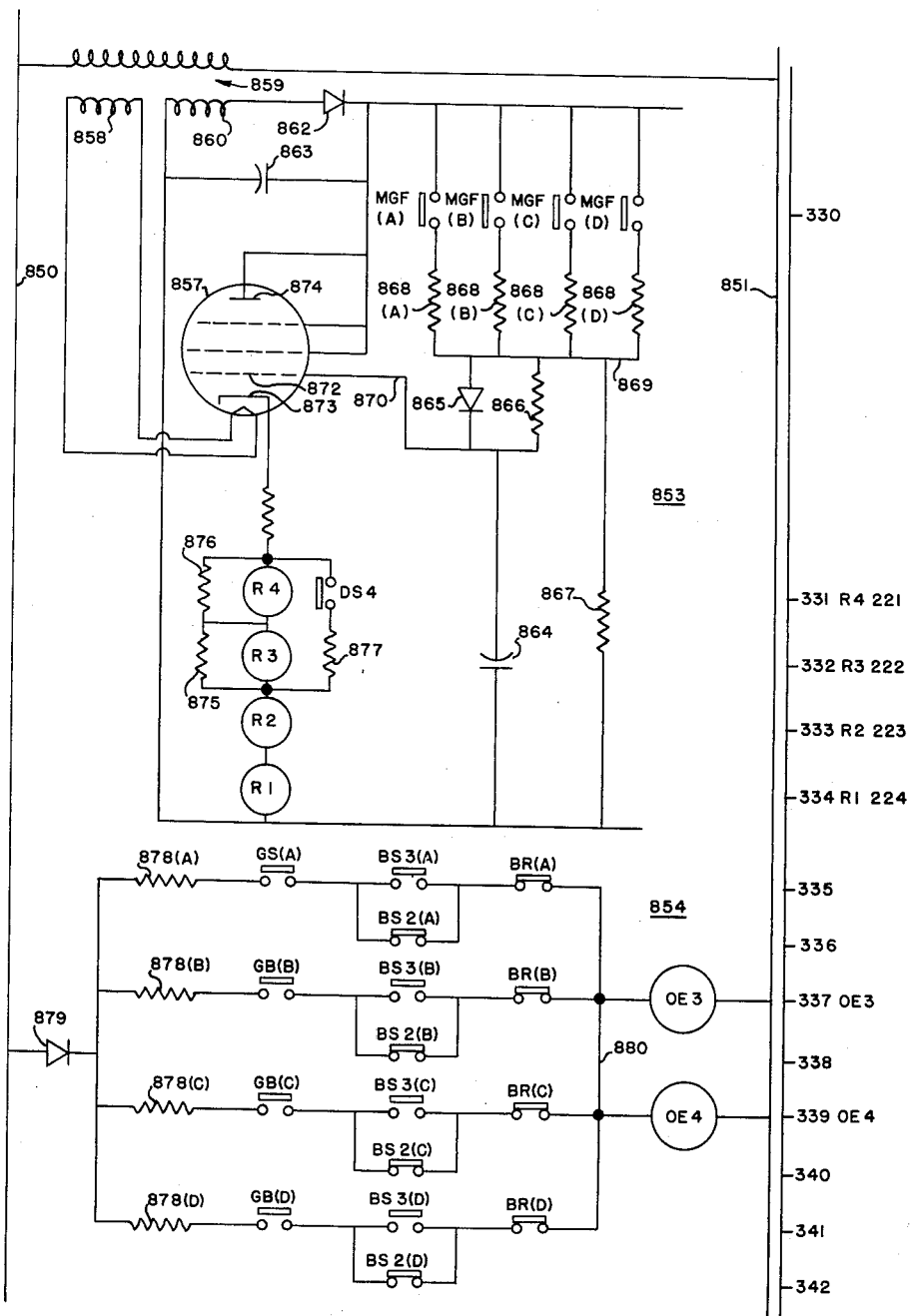
Fig. XII

3,065,824
ELEVATOR CONTROLS
Raymond A. Burgy, Maumee, and Paul F. De Lamater, Toledo, Ohio, assignors to Toledo Scale Corporation, Toledo, Ohio, a corporation of Ohio
Filed Oct. 16, 1959, Ser. No. 846,870
31 Claims. (Cl. 187—29)

This invention relates to elevator systems in general and more particularly to elevator systems in which a dispatching terminal may be shifted from a first floor to another floor in response to service demands on the system.

Objects of this invention are to improve elevator systems, to improve elevator service, to increase the efficiency and speed of response of elevators, and to facilitate the control of elevators as a function of service demands on the system.

In the past considerable effort has been expended to control the operation of elevator systems to meet the service requirements imposed thereon. Dispatching on various bases has been employed to distribute the cars in multicar systems. The operating pattern of individual cars and groups of cars has been dictated to satisfy the requirements with the best compromise between service to all landings and service for the traffic concentrations. A preferred approach is the establishment of several discrete operating patterns often defined as a balanced program for approximately equal up and down traffic, an up peak program for a preponderance of up traffic as at the beginning of the day and at the end of the noon period, a down peak program for a preponderance of down traffic as at the beginning of the noon period and at the end of the day, and an off hours or night program for traffic substantially below the capacity of the system.

Dispatching of elevator cars has been usually effected from and between a ground floor or lobby dispatching landing and a top floor or upper dispatching landing. This was generally satisfactory since in most buildings requiring elevator service the service demands have been concentrated between the two above named floors. The basements of such buildings were used for the installation of equipment which heated, illuminated or otherwise served the tenants of the building and for maintenance headquarters, etc. If the basements were used primarily for storage then a freight elevator, separate from the tenant elevator system, was usually employed. The floors required to serve high intensity traffic such as ballrooms or convention headquarters of such buildings were generally easily accessible from one of the two dispatching landings noted above.

In recent years buildings have been designed with a plurality of basements to provide parking spaces for the vehicles of the tenants. This then tends to create a sizable service demand at one or more of the basement floors for transportation either to the lobby or the upper floors of the building. Since most elevator systems give basement service only by taking one of the plurality of cars out of the dispatching sequence as provided between the two above-named floors, the efficiency and speed of response of such an elevator system in dealing with a large service demand below the lobby dispatching floor is very low. The system is affected in the same manner when a ballroom or assembly hall is located at a landing an inconvenient distance from one of the two dispatching landings. For example, when a meeting is over there is a concentrated traffic demand at that floor.

In accordance with the foregoing discussion one feature of this invention is to provide means for transferring the dispatching of an elevator car from a first landing to a second landing in response to a concentrated traffic demand at said second landing.

Another feature of this invention provides means for automatically transferring the dispatching of one or more elevator cars of a plurality of cars from a first landing to a second landing in response to a predetermined service requirement or an anticipated service requirement at said second landing.

Still another feature of this invention provides a transfer of dispatching from a first landing to a second landing in response to a predetermined demand for service at said second landing. The level of service requirements or demand is sensed or measured in terms of the number of passengers leaving a car, number of passengers entering a car or a total number of passenger transfers, or, said service demand may also be measured in terms of "stop time" of an elevator car at said second landing, or, may be measured as a combination of both in the embodiment illustrated herein.

It is to be understood that there are other means or conditions which may be sensed or measured which are functions of the service requirements of a system at landings other than initial dispatching landings which may be utilized to effect the transfer of dispatching of a car or cars to a landing where the traffic is concentrated. Further, the circuit means of this invention may be utilized in conjunction with program relays to add a "dispatch transfer" program to the "up peak," "down peak," "balanced," and "off hours" programs which are discussed herein. Such programs may be instituted in response to any of the three methods of effecting a change in the dispatching intervals or modes of operation of an elevator system discussed in the next paragraph or by other means well known to those skilled in the art. Thus, this invention comprises the method as described of operating an elevator system which derives the most beneficial use therefrom and the novel apparatus disclosed herein for carrying out said method.

Until recently, dispatch intervals have been set and operating programs have been selected manually and the car has been maintained under the primary control of an attendant so that the system controls augmented the attendant's control functions. With the advent of improved equipment, attendants and system supervisors have been eliminated to a large extent. In general the concept of operation for the automatic equipment replacing the manually actuated controls has been predicated on one of two bases. One approach has been to endeavor to anticipate the service requirements imposed and alter the operation to meet those requirements. This often entails shifting the mode of operation to the detriment of one class or type of service where no need for such a shift materializes. Another approach has been to await the development of a service demand that cannot be met by the current mode of operation and then effect a shift to a new mode better calculated to satisfy the requirements. Once excessive requirements have built up it is difficult to meet them and bring the system back into equilibrium. A third approach is the approach of the elevator system utilized herein to illustrate a preferred embodiment of this invention.

The illustrated system continuously monitors the operation of the cars and alters the dispatching interval and the general operating program or individual service features in accordance with the current service provided. Certain aspects of the system are altered in response to a combination of current service conditions and other conditions characteristic of anticipated service, car distribution, service demand and the like.

The primary factor influencing the operation of this system is the interval cars are stopped, termed the "stop time of cars." Stop time represents the current service provided and is particularly significant when measured while the cars are away from dispatching terminals since the variations in car trip time are a function of such stop time.

In order to achieve uniform distribution of cars in an elevator system, a dispatching interval should be established which is the average round trip time divided by the number of cars in service. A running integral of the stop time of cars in service is made and utilized to control the speed of a dispatch timer in this system to define intervals closely approaching the ideal. The number of cars in service is also effective in altering the dispatch timer speed. Thus the dispatch timer is slowed as the stop time of the cars increases and is slowed as the number of cars subject to dispatching decline.

Dispatching is effected as the release of a car a predetermined interval after the release of a preceding car so that the released car is permitted to start from its dispatching landing if a call is registered to which it is capable of responding. The dispatch interval is initiated upon the issuance of a dispatch signal to a preceding car. In the event that a preceding car fails to start in response to a dispatch signal, as where its doors are held, its dispatch signal is maintained without blocking the dispatch of a following car. Thus, dispatch failure circuits, previously employed to prevent the lock up of a dispatching system, have been eliminated. When a car responds to a dispatching signal, for example by initiating movement from the dispatching landing, the dispatch timer is reset to cancel the partially expired interval and initiate a new interval. Normally, the timer is reset within a few seconds and the dispatch intervals defined thereby are calculated to take these few seconds into account in defining the time spacing of cars.

Several discrete functions are performed by the dispatch timers including a shortening of the dispatch interval under certain circumstances, the holding of a partially expired interval and the actuation of a dispatch signal. The speed at which a dispatch interval expires is accelerated in response to a predetermined level of load in a car by setting the interval ahead to a given point and then causing it to run at high speed from that point. A similar acceleration of the interval is achieved when the stop time attains a predetermined level while a given number of cars are accumulated at a terminal.

At a given point in the running of a dispatch interval, the presence of a car at the dispatching landing and its availability for dispatching are sensed, and the speed of the timer is increased. If a car is available, the timer interval expires in a fixed period. Upon expiration of the interval, a dispatch signal is generated if a demand for service is registered to which the car can respond. If no such demand is registered, the timer is held at its expiration point until one is.

When a car subject to dispatching is required to provide service from a dispatching landing in a direction opposite that in which it is dispatched, it can be taken out of dispatching up to the instant a dispatch signal is issued. Another car is substituted for the removed car, when it becomes available, and the substituted car can be dispatched without further timing.

When the level of stop time is such as to indicate a moderate amount of service is being provided, it is undesirable to permit an accumulation of cars to stand at a terminal while they are dispatched in succession even for several shortened dispatch intervals. Impairment of service on this account is avoided by permitting more than one car to be dispatched from a terminal at the end of a single dispatch interval. In the exemplary four car system, the dispatch interval is accelerated when two cars are at a terminal and the stop time is characteristic of moderate service, and cars are dispatched on the termination of a single dispatch interval until only one remains if three or more are present at the terminal and moderate service is indicated by the level of stop time.

Four primary operating programs may be used with the illustrated system. The programs comprise an "up peak" program, an "off peak" program, a "down peak" program, and an "off hours" program. They can be selected manually or automatically. Automatic selection is effected in response to stop time or combinations of stop time and other conditions. The selection of a program bars any other program.

The "up peak" program is introduced when the stop time of cars set to travel upward attains a given level characterized as the peak up stop time or when a second level is attained characteristic of moderate up stop time and the loading of a car reaches a given level. A clock control may be provided to maintain the up peak program during a period for which a peak of up traffic is anticipated so that once up peak conditions are established during that period the program is held until the termination of the period or the decline in the up peak instituting conditions below the effective level, whichever is later.

The "down peak" program is introduced when the stop time for down traveling cars attains a down peak level. It too may be maintained if it is introduced during a period when down peak service is anticipated as defined by a clock control. Termination of the program occurs when the down stop time subsides below the down peak level or the period terminates, whichever is later.

When neither an up or down peak stop time level exists and the up and down peak programs are not in effect, the "off hours" program, or the "off peak" or balanced program is effective. If the stop time is above a predetermined level the off peak program prevails. When the stop time falls below the level sustaining the "off peak" program, the "off hours" program is introduced. Transfer from the off peak to the off hours program requires the cessation of off peak conditions for an interval, which may be several minutes, in order to avoid premature shifting as where the requisite conditions change only momentarily.

Up and down stop time below the peak levels and above a predetermined level introduces timed dispatching from both terminals, high call reversing of cars, and late car dispatching from high calls by virtue of the introduction of the balanced or off peak program.

Stop time of a given level is utilized to initiate zoning, preferential service to landing calls registered for a long interval, and immediate upward dispatching wherein timed dispatching from the lower terminal is eliminated. These features are incidental to the down peak program.

The above and other objects and features of this invention will be appreciated more fully from the following detailed description when read with reference to the accompanying drawings wherein:

FIG. I is a schematic diagram of an elevator system typical of the type to which this invention is applicable, showing representative landings, cars, actuating motors and controls;

FIG. II is an exemplary form of floor selector apparatus individual to each car for correlating signal and control functions with car position;

FIG. III is an across the line diagram of representative car call registering circuits for a car;

FIG. IV is an across the line diagram of representative car call stopping circuits and the basement service circuits for a car;

FIG. V is an across the line diagram of circuits individual to a typical car including safety circuits, car starting circuits, leveling control circuits, car position indicating circuits, direction throwover circuits and travel limit circuits;

FIG. VI is an across the line diagram of representative hall call registering and reset circuits and fragments of the cooperating car circuits and hall call car stopping circuits for a typical one of the cars;

FIG. VII is an across the line diagram of car position indicating circuits and circuits for indicating the registration of and the position of hall calls with relation to car position which are common to the cars of the system, and a typical individual car's cooperating circuits for responding to and actuating those circuits;

FIG. VIII is an across the line diagram of the up and down dispatch detenting, scheduling, basement service and stop time level controls for the system;

FIG. IX is an across the line diagram of the hall lantern and the stop time measuring circuits for a typical car;

FIG. X is an across the line diagram of a circuit for measuring the integrated stop time of cars while at a basement landing;

FIG. XI is a schematic diagram of equipment for detecting the entrance and exit of one or more passengers into or from an elevator car and generating control signals accordingly; and FIG. XII is an across the line circuit for measuring the integrated stop time of cars at floors other than a basement floor and for measuring the number of cars in service.

A typical elevator system of four cars serving ten floors and a basement has been chosen for illustration of this invention. Such a system is represented in FIG. I wherein each car 530 is provided with a closure 531 of one or more doors and a door operating mechanism 532 including a motor, timers for measuring the interval the car is open, limit switches responsive to door position, and safety mechanisms. The four cars are designated cars A, B, C and D and the reference characters for individual elements associated therewith where shown in duplicate for the several cars are identified with the respective cars by a parenthetical suffix letter as 531(a) for the closure of car A and 531(d) for the closure of car D. The cars are illustrated as located at the tenth, fifth, first and basement landings, many of the intermediate landings being deleted for convenience in illustrating the invention.

A lifting motor 533 and advantageously of the variable voltage, direct current type, is energized from a motor-generator set (not shown) in any convenient manner as is known to the art, and is coupled to the car by means of a shaft 534 upon which is mounted a cable sheave 535 for lifting cables 536. Control of the lifting motor is effected for accelerating and decelerating by means of a sequencing device 537, advantageously a cam operated rheostat. Operation of a car and the system as a function of car position is implemented by a floor selector 538 comprising an array of contacts positioned to correspond to landings and a cross head 539 carrying brushes for engaging the contacts and arranged for movement in accordance with the effective car position as will be discussed more fully with reference to FIG. II. The crosshead 539 is driven by an essentially constant speed advance motor 540 to advance the brushes along the contacts. A shaft 542 of advance motor 540, and shaft 534 coupled thereto through a clutch 543 in combination drive a differential 544 which in turn drives the sequencing device 537.

Each car is provided with a group of individual control circuits represented by block 545 and the system master control is represented by block 546 coupled to the individual car controls.

Service requirements are registered at the several landings by registering device 547 conveniently located with respect to the car entrances. These devices will be considered as push button switches for illustrative purposes although alternative devices are known. Each landing except those at the car travel limits is provided with an up and down hall button while the uppermost landing has only a down button and the basement landing only an up button. Car occupants register their service requirements on car buttons for the several landings located on a panel 548 which can include additional controls as will be discussed. For the convenience of the passengers a second car button panel 549 is located in the car in a position remote from the panel 548, as on another wall of the car, so that car calls can be registered at either position.

The presence of a car at a landing and the direction in which it is set to leave the landing is indicated by some conveniently located means such as a hall lantern 551. Separate up and down indicators for each car can be provided at the landings intermediate the limits of travel, each car has an up indicator at its lower limit, and each car has a down indicator at its upper travel limit.

Correlation of the operation of floor selector 538 with car position so that signals are picked up in advance of the car, the car is slowed and stopped, effective car position is indicated, signals to which the car has responded are reset, the car is reversed at its highest call or at the top of its zone and other functions are effected, is accomplished by mechanically advancing a brush supporting crosshead 539 as the car is operated. That crosshead is positioned with respect to rows of contacts 549 associated with the several landings served in correspondence with the effective car position, as best seen in FIG. II. These contacts 549 are arranged in lanes along the path of the crosshead, shown as vertical in the drawing, so that contacts of a lane perform like or related functions for the landings of their respective rows when engaged by brushes 541. Since the cars travel at speeds requiring substantial slow down intervals, the crosshead 539 is driven ahead of the car while the car is in motion or conditioned to move and is in actual correspondence with car position only while the car is stopped. The means for advancing the crosshead with respect to the car position is an advance motor 540 which runs, when the car is set to run, to rotate a shaft 550 coupled to the crosshead by means of the pulleys 552 and chain 553 which extends to corresponding pulleys 554 at the top of the selector machine contact panel 555.

An appreciation of this system will be facilitated by first considering the operation of an individual car and then integrating that operation with the other elements, the combinations and subcombinations providing the comprehensive service demanded of present day systems. Many of the controls are individual to the cars, a four car system having them duplicated four times. In the interest of reducing the disclosure of the system to its simplest terms the control circuits of only one car have been illustrated in most instances and points at which controls are multiplied or parallel are shown as discontinuous arrow-headed lines.

The relays in the figures illustrating an embodiment of the teachings of this invention are as follows:

| Symbol | Name | Line Location |
|---|---|---|
| ACL | Attendant Door Close Relay | 111 |
| AS | Attendant Start Relay | 131 |
| AT | Acceleration Time Relay | 121 |
| BDC | Dispatching Shift Relay | 227 |
| BDCA | do | 228 |
| BDR | Down Car Run Relay | 186 |
| BR | Basement Run Relay | 193 |
| BS | Basement Service Relay | 68 |
| BST | Basement Service Time Relay | 73 |
| BSTA | do | 72 |
| BS1 | Basement Service Relay | 65 |
| BS2 | do | 66 |
| BU | do | 215 |
| BUR | Up Car Run Relay | 189 |
| BZT | Door Close Buzzer Time Relay | 120 |
| B1 | Basement Stop Time Relay | 275 |
| B1A | Auxiliary Basement Stop Time Relay | 229 |
| B2 | Basement Stop Time Relay | 274 |
| B2A | Auxiliary Basement Stop Time Relay | 230 |
| CB | Car Signal Direction Relay | 55 |
| CBA | do | 56 |
| CBD | do | 64 |
| CB1 | Car Signal Relay | 67 |
| CLS | Door Closing Relay | 109 |
| CS | Car Starting Relay | 105 |
| CSA | Car Starting Relay | 107 |
| CULX | Up Load Relay | 258 |
| CUNB | Up Next Relay | 262 |

| Symbol | Name | Line Location |
|---|---|---|
| DFD | Down Dispatch Timer Hold Relay | 201 |
| DFDA | do | 200 |
| DFU | Up Dispatch Timer Hold Relay | 212 |
| DFUA | do | 211 |
| DS1 | Stop Time Relay | 224 |
| DS2 | do | 223 |
| DS3 | do | 222 |
| DS4 | do | 221 |
| DTO | Dispatch Floor Throwover Switch | 225 |
| EM | Emergency Relay | 101 |
| G | Gate Relay | 103 |
| GA | Auxiliary Gate Relay | 104 |
| HCT | Highest Call Relay | 174 |
| KD | Down Scheduling Relay | 206 |
| KDT | Down Scheduling Timer | 219 |
| KU | Up Scheduling Relay | 208 |
| KUT | Up Scheduling Timer | 220 |
| LD | Down Leveling Relay | 115 |
| LNT | Terminal Lantern Relay | 213 |
| LU | Up Leveling Relay | 113 |
| MBR | Basement Stop Time Relay | 123 |
| MG | Bottom Dispatching Floor Relay | 190 |
| MGA | do | 191 |
| MGF | Intermediate Floor Stop Time Relay | 257 |
| MGX | Bottom Dispatching Floor Relay | 192 |
| MG1 | Top Dispatching Floor Relay | 185 |
| OE3 | 3-Car In Service Relay | 337 |
| OE4 | 4-Car In Service Relay | 339 |
| PC | Photo Relay | 280 |
| PCT | Car Photo Timing Relay | 288 |
| PCT1 | do | 287 |
| PH | Direction Sensing Relay | 282 |
| PL | Photo Relay | 281 |
| PLA | Auxiliary Photo Relay | 286 |
| RB | Car Button Reset Relay | 126 |
| RL | Car Direction Throwover Relay | 125, 127 |
| R1 | Stop Time Relay | 334 |
| R2 | do | 333 |
| R3 | do | 332 |
| R4 | do | 331 |
| S | Landing Signal Stopping Relay | 155 |
| SBU | Hall Call Relay | 150 |
| SC | Car Signal Stopping Relay | 53 |
| SD | High Call Slowdown Relay | 160 |
| SS | Hall Call Indication Relay | 181 |
| STD | Hall Call Relay | 140 |
| S1D | do | 144 |
| S1DA | do | 218 |
| S1U | do | 148 |
| S1UA | do | 217 |
| S2D | do | 142 |
| S2U | do | 146 |
| 2LU | Low Down Speed Leveling Relay | 117 |
| 2LU | Low Up Speed Leveling Relay | 119 |

These relays and all others illustrated are shown in across the line diagrams. Their contacts therefore are often located remote from the actuating coils. In order to illustrate the relationship and location of actuating coils and contacts, a marginal key has been employed with each circuit diagram whereby the circuits are divided into horizontal bands which are identified by line numbers in the right hand margin of the figure. Relay symbols are located in that margin to the right of the key numerals and in horizontal alignment with the relay actuating coil positions. Each contact actuated by a relay coil is designated to the right of the relay symbol by the numeral of its line location. Back contacts, those which are normally closed when the relay armature is dropped out and are opened when the actuating coil is energized, are underlined in the key to distinguish them from front contacts, those which are closed upon the coil being energized. Thus for example, car signal direction relay CB has its actuating coil located on line 55 of FIG. IV and when energized closes its front contacts at line 104 of FIG. V designated in the margin as 104 and opens its back contacts at line 64 of FIG. IV designated in the margin by $\underline{64}$ and at line 210 of FIG. VIII designated in the margin as $\underline{210}$. Each contact is also labeled with the symbol of its actuating means and is illustrated in the condition it assumes while its armature is dropped out so that the front contacts of the car signal direction relay are shown open as in line 104 and is labeled CB while the similarly labeled back contacts in lines 64 and 210 are shown closed.

In initiating operation of a car the motor generator set is first placed in operation. The motor-generator actuating controls for an individual car comprise means for energizing the motor-generator set and the remainder of the control system associated with that car upon the energization of rectifier disconnect relay RE (not shown). Main power supply leads are energized from an alternating current source and supply relay RE through normally closed contacts of an overload relay OL (not shown), a normally closed motor-generator set stop switch MGS1 located at the set, the closed contacts of a reverse phase relay RP (not shown) connected in the three phase supply to the system so as to be pulled in as long as the lines are connected properly, and normally closed motor-generator stop switches MGS2, MGS3 and MGS4 which can be located at the controller panel for the car, in the starter's panel at a dispatching terminal and in the car respectively. Manual starting of the motor-generator set is accomplished by closing one of the motor-generator start switches MGB-1, MGB-2, MGB-3 and MGB-4 located with the corresponding stop switches at the set, the controller, the starter's station, and in the car respectively. The start switch is maintained closed until the set is up to speed and contacts LR (not shown) are closed to establish a holding circuit for relay RE which is retained until the conditions in the system reach a state warranting the shutting down of the set by opening of one of the overload, stop, reverse phase or motor generator automatic shutdown timer contacts MGT (not shown).

Upon closure of its energizing circuit, relay RE closes contacts (not shown) which apply a direct current source across the direct current car controller circuits, closes contacts RE to energize motor-generator set starting relay LSA, and opens back contacts (not shown) in the elevator motor shunt field (not shown) to remove a shunt around a current sensitive, motor field protective relay FP (not shown) so that relay will pull-in when the field current has built up to a predetermined level. While the motor field current is below the pull-in level for relay FP, motor-generator starting relay LS (not shown) is energized through back contacts of relay FP and closed contacts of relay LSA. Front contacts (not shown) of relay LS connect the three phase motor (not shown) of the motor generator set in a Y connection to start the motor. This connection is maintained until the motor has attained a predetermined speed, essentially synchronous, as measured by the current level in one arm of the Y by a motor generator acceleration relay ACC (not shown) which drops out when the current falls below the hold-in value of that relay.

When the set attains speed, contacts ACC open to de-energize relay LS thereby opening the Y connection in the set motor and closing black contacts LS to energize motor-generator set running relay LR since contacts FP of the lifting motor field protective relay are now closed. Relay LR closes contacts (not shown) in the set motor to connect it in delta and maintain that connection until the set is shutdown. It also establishes a holding circuit for relay RE which is maintained during car operation.

The car is conditioned to operate when its motor-generator set is placed in operation provided its individual car cut-out switch (not shown) is closed to energize individual service relays GSA, GSB and GS (not shown). This cut-out switch is maintained closed while the car is operated. When it is desired to remove a car from service with those in the bank remaining in service, a cut-out switch for that car is opened to drop out its relays GSA, GSB, and GS.

For details of the aforementioned circuits and of other operational circuits for a four car system with which this invention may be utilized reference is made to co-pending application Serial No. 808,220 entitled "Elevator Controls," by Raymond A. Burgy, filed March 30, 1959, and assigned to the same assignee as the present invention.

The present system of elevators is designed to operate "on call," that is, its cars run only in response to the registration of calls for service, usually car or hall calls although calls might also be registered from other locations and by other means such as from a main control as where a car is assigned to a predetermined landing at a certain time by a clock control. However, it is to be understood that the inventive features embraced herein are not limited in their application and can be employed with other than on call systems.

A car call registering means is depicted in FIGS. III and IV. Since the cars are arranged for optional passenger operation, they are provided with a main and an auxiliary panel of call registering devices, push button switches in the present embodiment. The circuits interconnecting these switches and their construction is set forth in detail in J. H. Borden's United States Patent 2,738,489 of March 13, 1956 entitled "Auxiliary Car Button Controls for Automatic Passenger Elevators." They comprise a main push button switch for each landing serviced CC, C1, C2, C3, C9 and C10 for the basement, first, second, third, ninth and tenth landing car buttons shown in FIG. IV and a corresponding auxiliary car button CCA, C1A, C9A and C10A for the basement, first, ninth and tenth landings. It is to be noted that in this discussion, those disclosures concerning hall buttons and those disclosures concerning controls individual to a landing are illustrated for exemplary floors only and are not represented for each floor which might be present in the system since the elements are duplicated for the several floors.

When the main car buttons are closed, they are held in by holding coils 563 of FIG. III which are energized through resistors 564 and controlling contacts MGA, EL, BS2, RB and MGA by connection across a source of direct current (not shown). The contacts of main car buttons are also actuated by closure of auxiliary car button contacts CCA to C10A since the corresponding holding coils are momentarily energized by sufficient current to produce a magnetic flux which draws them closed and thereafter holds the closure by the lower level holding current which flows through resistors 564. Contacts TO at line 10 are opened by an attendant throwover switch to disable the auxiliary bank of car buttons while the car is operated by an attendant.

The entire bank of car button contacts is normally released when the car is reversed by the operation of car button reset relay RB to open back contacts RB at line 14. Back contacts EL at line 14 are opened while the express-local relay (not shown) for the car is energized to confine its operation to a lower region of the range of landings served and prevent the registration of calls for landings in the upper portion of the service range, e.g. if lead 565 were connected to landings 6 to 10, car calls could not be registered for those landings while the EL contacts for that car were open. Calls for these higher landings are barred from registration by the back contacts MGA at line 12 which are open while the car is at the first landing by operation of lower terminal car position relay MGA at line 191 of FIG. VII to avoid operation by departing passengers. However, contacts MGA close as soon as the car leaves the lower terminal to permit registration of calls for the upper floors. This feature corresponds to and can be expanded to embrace all features of E. B. Thurston's United States Patent 2,779,438 for "Car Call Cancellation Means" which issued January 29, 1957.

Since the cars are normally stopped and reversed at the first landing and since a basement landing below the first landing can be served, contacts MGA close at line 15 before contacts RB at line 14 open so that the registration of a basement call, as signified by the closure of contacts BS2 at line 15 will render the operation of contacts RB ineffective and maintain the energization of the car buttons until the car has traveled to the basement.

In the case of an erroneous car call registration an individual car call can be canceled by opening the holding coil circuit for that car button by means of a reset button 566 in the main panel or a corresponding button 567 in the auxiliary panel.

Registration of a car call actuates the circuit shown in FIG. IV by stopping a moving car as it reaches a landing for which the call is registered and by indicating the position of the call relative to the car as above or below the car. The car is stopped by energization of stopping sequence relay SC at line 54 when its floor selector brush 568 engages an active floor selector contact 569 in the car call contact lane. The car button contacts C2 through C10 render their car call circuits active when closed. Similarly, the closure of contacts C1 at line 67 energizes car button relay CB1 to close its contacts at line 62 and closure of contacts CC at line 68 energizes basement service relay BS to close its contacts at line 65 and energize basement service relay BS1 closing contacts BS1 at line 63. Thus, contacts CB1 and BS1 correspond to contacts C2 through C10 for their respective landings in activating their floor selector contacts 570 and 572.

The location of registered car calls with respect to current effective car position is also determined on the floor selector machine by means of the lanes of normally closed contacts 570 and 572 for calls above and below the car respectively. A call above the car energizes car signal direction relays CB and CBA at lines 55 and 56 provided the car is not the next to be selected for up load as indicated by opening of back contacts CUN at line 55 and is not set for travel downward by opening of its down signal direction relay back contacts DL1 at line 55. A call below the car energizes down car signal direction relay CBD at line 64 if the car signal direction relay back contacts CB at line 64 are closed. Completion of these energizing circuits through contact lanes 570 and 572 is restricted to those car button circuits above and below the car respectively by means of floor selector crosshead carried cams 573 and 574, respectively. When the cross head is at the fourth row of contacts, up cam 573 isolates the car buttons for the third floor and floors below from lane 570 by opening the second and third floor back contacts of that lane. In the same manner the third floor car button and buttons for the floors above are isolated from the down lane 572 by down cam 574 which opens the third and fourth floor back contacts for that lane. Accordingly, a car call for a landing above the current effective position of the car while it is set for travel upward will energize relays CB and CBA through the closed series of contacts 570 and any available one of closed car call contacts CB1 and C2 through C10 to lead 575. Similarly, a car call for a landing below the effective car position will energize relay CBD through the series of closed contacts 572 and any available one of the closed car call contacts if relay CB is not energized to open contacts CB at line 64.

When the system is conditioned to reverse a car at its highest call, relay SC is sealed in through contacts SC and high call reversal relay contacts HCR at line 50. The top and bottom contacts 569 of the car call stopping lane on the floor selector are tied directly at lines 51 and 57 to the main lead 575 from the source of alternating current to insure stopping of the car.

The first landing contact 569 at line 56 is provided with supplemental circuits to insure stopping under certain conditions other than the registration of a car call. Since this contact is not in parallel with the car call position indicating circuit for connection by car button contacts as for landings above the first, contacts CB1 at line 54 are closed to stop the car when a first landing call is registered, and a circuit is completed for the car position circuits through contacts CB1 at line 62. The first landing contact 569 is also connected to stop the car through the normally closed direction throwover contacts DTO at line 56. The function of this contact will be explained hereinafter.

The operation of the high call reversal circuits and basement service involving relays BS, BS1, BS2, BST and BSTA will be discussed below.

Hall calls are registered, are effective in stopping the car, are reset, and are given preference at certain landings when registered for a predetermined interval in the circuits of FIG. VI. An up hall call button CU through 9U for actuating a latch-type relay SBU to S9U is provided for each landing having landings above and a similar down hall call button TD to 1D for the first through tenth floors having a landing below is provided to actuate corresponding latch-type relays STD to S1D. These contacts and relay families are represented fragmentarily in lines 140 through 151. The down hall call relays can be of any convenient form wherein energization across one pair of terminals latches their contacts in actuated position until a second pair of reset terminals are energized to drop out the activated contats. The present hall call relays are reset by energizing their reset terminals at the time the call is answered. One reset terminal is connected to a corresponding contact in a lane of floor selector contacts 576 to complete a circuit therethrough from main leads 577 and 578 connected to an alternating current source. A similar reset circuit is provided for each up hall call relay from individual floor selector contacts 579 of the floor selector. Brushes 580 and 582 for the down and up lanes of contacts 576 and 579 are carried by the floor selector crosshead so that they engage a contact in advance of the arrival of the car and reset the registered hall call as soon as the car stopping operation is initiated. Only one brush is active at any given instant since up and down relay contacts UL and DL at lines 146 and 142 operate in a mutually excluding manner. Thus, if the car is not set to by-pass, contacts BP of the by-pass relay at line 142 are closed, and it is an up load car, contacts UL of the up relay at line 146 are closed, the hall call will be reset when the advance motor relay contact VR2 is closed at line 144 during car stopping. A down signal is reset in the same manner by brush 580 engaging a contact 576 while contacts DL are closed at line 142. The rapid resetting of hall signals is desirable since only one car should respond to each call and all cars of a bank are responsive to a registered hall call through parallel connected contacts on their individual floor selectors as indicated by the arrowheaded leads 583.

Basement hall call relay SBU sets a car to travel downward from the first floor as will be discussed. Therefore, actuation of the down hall call relay S1D at the first landing is arranged to actuate relay SBU by closing contacts S1D at line 152. This circuit does not impede resetting of relay SBU since its back contacts SBU are opened at line 152 when it is energized.

Before considering the details of stopping operations in response to car and hall calls shown in FIG. VI, the general operation of a car will be described beginning with a car starting operation, its running functions and its slowdown functions. Car stopping generally and the specific operations in response to car and hall calls will then be set forth.

As will be described, the registration of a car or a hall call initiates a dispatching operation for a car located at a terminal which results in the issuance of a start signal for that car. At landings other than the dispatching terminals the cars are started an appropriate interval after they stop or after the last obstruction clears the door path. The starting circuits are shown on FIG. V. They involve the energization of car starting relay CS at line 105, and door closing relays CSA and CLS at lines 107 and 109. These circuits are energized from a source of direct current while rectifier disconnect relay RE (not shown) is energized to feed main leads 584 and 585. The circuits are completed through one of the parallel circuits between lead 584 and lead 586, through back contacts VR2 of the advance motor stopping relay, emergency relay contacts EM, door opening relay back contacts OPB, lead 587, relays CS and CSA, back contacts TO, and contacts TR of the start time relay. While a car is stopped, the emergency relay EM is normally energized at line 101 through the motor generator set run relay contacts LR and the safety switches at line 103, the rheostat contacts RH1, which are closed while the car is stopped, and the door open contacts DO at line 102. Contacts BK and AM energize relay EM while the car runs even though at that time the door open relay is ineffective to maintain closed the door open contacts DO at line 102.

If the car is on automatic operation and has been standing at the dispatching landing a sufficient interval for the start time relay to time out and close TR, then starting of the car is subject to the circuits between leads 584 and 586. When the cars are at landings other than the dispatching terminals, a starting circuit is completed at line 109 through the attendant start AS contacts. The MGA contacts at line 132 are open while the car is at the lower terminal and the MG1 contacts at line 132 are open while the car is at the top terminal, therefore relay AS at line 131 is energized while the car is at neither dispatching terminal.

When the car is at a dispatching terminal, any of several paths can be completed between leads 584 and 586 to institute a car starting operation. Dispatching upward is effected from the lower terminal by closing contacts STT at line 108 a short interval after an up dispatch signal is registered and that starting circuit is held thereafter until the car leaves the terminal. A down dispatch signal closes contacts CDD at line 111 to start a car downward from the top dispatching terminal.

The cars can be started at dispatching terminals without a dispatching signal being issued under several circumstances. On an "off hours" operating program, car doors may be reclosed at the lower terminal. In order to avoid locking a passenger who inadvertently entered other than the load car, the cars are responsive, when their doors are reclosed (contacts RCL at line 104 are closed) and they are not on load status (contacts CUL at line 104 are closed), to calls registered on car buttons as indicated by the closure of contacts CB at line 104 to energize the cart starting circuits and send the car from the terminal immediately. A down traveling car which has been selected for basement service will start from the lower terminal without awaiting a dispatch signal since its car starting circuits are completed through contacts DL1 and BS1 and above main floor back contacts AMF at line 113. Similarly, a car traveling upward from the basement will start from the lower dispatching terminal without awaiting a dispatch signal by virtue of closed basement run relay contact BR at line 112. Cars can be started without opening and closing their doors when stopped short of a dispatching terminal floor, as by an emergency stop, since gate relay contacts GA at line 110 are closed.

Contacts AS at line 109 are also closed when the car is operated by an attendant, however, under those conditions starting is subject to the operation of car door close switch 588 and start switch 589 since back contacts TO in line 105 disconnect the start time control, contacts TO at line 111 are closed and back contacts TO at line 109 are opened so that relays CS and CSA are energized from lead 587 through lead 591, the now closed attendant door close contacts ACL at line 111, switch 589 and lead 592. The attendant door close relay ACL is energized under attendant operation through the then closed TO contacts at line 111 and one of the switches 580 and 589.

Energization of car starting relay CS closes its contacts in the field and brake relay circuits to condition them for energization when the gate is closed. It initiates the timing out of flux decay type door close buzzer time relay BZT by opening back contacts CS at line 120. A retiring cam relay is energized by the closing of CS contacts. Retraction of the retiring cam permits the door and gate to be locked mechanically and electrically when they reach their closed positions.

Operation of door close relay CSA closes its contacts at line 111 to energize door close relay CLS, closes contacts to energize a start time relay, closes contacts to initiate door closing, closes contacts to complete a door close warning buzzer circuit which remains energized until relay BZT drops out to open its contacts BZT, and opens back contacts CSA at line 243 of FIG. IX in the hall lantern circuits.

When door close relay CLS pulls in it seals the starting circuit around the timer contacts TR by closing contacts CLS at line 106 between leads 587 and 592 thereby insuring the complete closure of the door and the starting of the car. It also completes an alternate starting circuit between leads 584 and 586 around contacts STT by closing contacts CLS at line 107.

The car is started upon completion of the door closing operation by the simultaneous initiation of operation of an advance motor circuit and the elevator brake and lifting motor circuit. The acceleration and deceleration of the elevator lift motor is controlled by a rheostat in the control circuit for a generator supplying the direct current lifting motor. This rheostat is driven by a differential from the lifting motor and an advance motor in the manner described in detail in J. H. Borden's U.S. Patent 2,685,348 of August 3, 1954 entitled "Elevator Control System" wherein the rheostat causes accelerating forces to be imposed until the car is up to speed. A constant speed advance motor is started at the instant the elevator lift motor is started. Since the lift motor accelerates gradually, the advance motor initially drives the differential in a manner to operate a series of cam controlled rheostat contacts (not shown in their entirety) in sequence to remove resistance from the generator field. As the lift motor gains in speed the rate of advance of the cam shaft is first reduced, then stopped and then reversed to open certain contacts and produce a balanced condition at speed wherein the differential output is stationary. The advance motor also drives the floor selector crosshead as described above. When the crosshead picks up a registered call for a floor, as will be described, the advance motor stops essentially instantly centering the crosshead at the position on the floor selector corresponding to the landing of the call. When the advance motor stops, the differential drive operates the cams to operate the contacts in the reverse of their car start operating sequence so that the voltage to the lift motor is reduced and the car is decelerated as it approaches the landing. Shortly before it reaches the landing, leveling circuits assume control of its position, as will be described, thereby accurately positioning it and maintaining synchronism with the crosshead carriage which has corrected its position. This correction of car and crosshead alignment is effected at each stop to avoid malfunctions due to cable stretch, slip and the like.

When the gate is closed following operation of the car starting circuits, and all of the safety switches including the emergency exit switch 595 and the gate switch 596 at line 103 are closed, gate relay G is energized closing its contacts in the advance motor circuit.

The direction of travel of a car is determined by direction throwover relay RL shown at lines 125 and 127 of FIG. V. The operation of this relay will be discussed later, however, it is to be noted that its contacts control up and down direction relays UL and DL and maintain a completed circuit for one or the other of these relays under all conditions. It is also to be noted that the direction throwover relay RL is disabled while the car is in motion by the opening of the brake relay back contacts BK1 at line 125.

The effect of a call on a traveling car will now be considered. Assume that a call has been registered in the car for the third landing by closure of contact C3 at line 60 of FIG. IV. This places power on the third floor contact 569 of the floor selector machine, car call stopping lane of contacts at line 54 so that engagement by brush 568 supported by the crosshead energizes car call stopping sequence relay SC. Operation of relay SC closes its contacts to initiate the stopping of the advance motor, closes contacts at line 50 to enable a high call reversal operation, as will be discussed, and closes a contact to a high call reverse relay HCR (not shown).

If a hall call had been registered, the up traveling crosshead of the floor selector would have carried brush 616 into engagement with an active contact 617 of the lane of up hall call stopping contacts on the floor selector, of FIG. VI. Registration of a second floor up hall call by closure of contact 2U at line 147 to energize relay S2U closes contact S2U at line 157 to activate contact 617 and the corresponding contacts of the other floor selectors of the bank of cars all connected in parallel therewith through arrow-headed lead 618. Hall call stopping relay S in line 155 is energized as brush 616 engages contact 617 if the up field relay contacts UF2, the load by-pass relay contacts LBP, the advance motor relay contacts VR2, the rheostat position relay contacts RH3, the by-pass relay contacts BP and the brake relay contacts BK all in line 155 are closed. Energization of relay S closes its contacts at line 153 and contacts S to initiate stopping of the advance motor in the same manner as for a car call. Relay S is maintained energized until the car is leveled at the floor and the brake is set opening contacts BK. When the stopping sequence is initiated, advance motor stopping relay contacts VR1 are closed to establish a holding circuit for relay S with its contacts S at line 153. It is shortly after this holding circuit is established that the hall call relay is reset by engagement of brush 580 or 582 with reset contacts. The purpose of rapidly resetting these contacts is to avoid the completion of a second car stopping circuit when a following car passes the floor. Since the floor selector contacts 617 for the up stopping circuit and 685 for the down stopping circuit are connected in parallel for the several cars, a sneak path can be established through the stopping relay holding circuit. This path is opened upon the energization of advance motor stopping relay VR2 to open its back contacts at line 155. When the brake is set and the car is leveled, contacts BK and VR1 are opened to deenergize relay S.

As the car approaches a floor for which its floor selector machine crosshead is stopped, the cam operated contacts are opened in a reverse succession from that in which they were closed during car starting so that the resistance in the generator field is increased, lowering the voltage applied to the lift motor and slowing the car. The cam operated contacts are synchronized with the position of the car relative to the crosshead so that they deenergize rheostat position relay RH3 (not shown) then rheostat position relay RH2 (not shown) and then rheostat position relay RH1 (not shown) as the landing at which the stop is to be made is approached. This sequence transfers operation of the car from control by the rheostat cam contacts to leveling circuits associated with cooperating devices on the car and in the hatchway. Such leveling devices are often magnetically actuated and can be of the form shown in J. H. Borden's U.S. Patent 2,598,214 of May 27, 1952 entitled "Inductor Leveling Switch." These leveling switches are represented in the dotted rectangle at lines 112 through 119 for high and low speed leveling in the up direction HLU and LLU and for high and low speed leveling in the down direction HLD and LLD.

As the advance motor stopping is initiated contacts AMR at line 115 are closed. This energizes acceleration time relay AT at line 121. If the car is operating without an attendant, door close buzzer time relay BZT is energized at this time also through closed car starting relay contacts CS and door reclosing relay contacts CL4 at line 120. Since normal operation is assumed, contacts LP at line 115 of the protective relay are closed. Contact A at line 115 of the acceleration relay closes as the cam shaft deenergizes relay RH3 to open its contacts and shortly thereafter, contact RH2 is closed at line 116 by operation of the cam shaft so that the leveling relays LU, LD, 2LU and 2LD can be energized as the inductor relay vane (not shown) in the hatchway is approached by the leveling units individually controlling contacts HLU, HLD, LLU and LLD.

During the starting of a car the leveling controls are disabled by the energization of advance motor auxiliary relay to open back contact AMR at line 115 incidental to the closure of the car gate to close contacts G and the closure of contacts M of the main switch.

Upon energization of the car starting circuits and the closure of the car doors the advance motor is energized to carry the crosshead away from the row of contacts corresponding to the landing at which the car is stopped and the differential is actuated to establish starting connections in the generator and lifting motor. Opening of car starting relay contacts CS at line 120 deenergizes relay BZT. At the same instant relay CSA is energized to close its contacts in a warning alarm circuit (not shown). Since BZT is a slow dropout relay, contacts BZT and CSA in the warning alarm circuit are both closed momentarily to sound a warning buzzer indicating that the car doors are about to close. Upon drop out of relay BZT the buzzer ceases to sound and door closing is initiated. The gate relay G at line 103 is energized when the doors reach a fully closed position.

As the car continues its travel it is stopped at the top or bottom landing by simulated car calls through the direct connection of contact 569 to main lead 575 at line 51 for the top and at line 57 for the bottom so that car call stopping relay SC is energized. If for any reason these circuits fail to function, the car is provided with limit switches which are actuated as it approaches the limits of its travel to stop it and prevent its restarting in the direction toward its terminal. These switches begin to function when the car has proceeded toward its limits of travel beyond the position wherein the advance motor stopping relay sequence would have functioned and the car initiated its normal slowdown sequence for the last landing. If the normal operation fails, the safety operation stops the car in a manner corresponding in some respects to the above described car stopping operation.

In normal operation the car slows and stops at one of its limits of normal travel and, is reversed and has its car call contacts reset by operation of the circuit shown in FIG. V at lines 122 to 130. Contacts 640, 643 and 644 are located in a lane on the floor selector machine at rows respectively corresponding to a top dispatching terminal landing, a bottom dispatching terminal landing, and a basement landing below the bottom terminal. As an up traveling car stops at the top dispatching landing floor selector brush 645 of the reversal circuit engages contact 640 to complete a circuit from lead 584 through car button reset relay RB at line 126, the lower coil of direction throwover relay RL and closed back contacts DL of the down signal direction relay, through leads 646, contact 640, brush 645 and lead 647 to lead 585. Energization of relay RB opens back contacts RB at line 70 in the basement service circuits of FIG. IV and resets the car button holding circuits of FIG. III by opening back contacts RB at line 14. The alternate holding circuit for the car buttons at line 16 is opened at contacts MGA, which are open except when the car is at the first floor, to break the connection through the holding coils 563 for direct current supply leads 648 and 649.

Energization of the lower coil of direction throwover relay RL deenergizes the up load relay UL (not shown) by opening front contacts RL and closes back contacts RL to energize down load relays DL and DL1 (not shown). Lower coil RL when energized, also open closed front contacts RL at line 244 in the up hall lantern circuit and closes back contacts RL at line 252 in the down hall lantern circuit. Thus, when the car is started from the top terminal its controls and signals are set for downward travel.

When the car is at the lower terminal landing, it will be reversed unless a basement call is registered since the upper coil of relay RL will be energized through back contacts UL at line 125, back contacts BS of the basement service relay at line 124, dispatch throwover back contacts DTO and lead 650 to contact 643. However, if a basement call is registered as by the closure of contacts CC at line 68 of FIG. IV to energize relay BS. back contacts BS at line 124 will open so that floor selector contact 643 for the first terminal will be disconnected from the relays. The car will then travel downward and serve the basement call and will be reset for up travel when brush 645 engages contact 644 for the basement landing which will energize the upper coil of relay RL through the group service relay back contacts GSB.

The present system is illustrated with dispatching from a first landing and a basement landing below the first landing. Ordinarily the down traveling cars are reversed at the first landing and sent upward therefrom. However, a down traveling car with a car call for basement service registered will ordinarily proceed to the basement without stopping at the first landing unless a first landing car call as noted by the closure of the CB1 contacts at line 54 or a down hall call is registered. Once a car is stopped at the first landing without being subject to a basement call it is set for travel upward and is exclusively responsive to basement service for an interval, thereafter it is responsive to basement car and hall calls until it is placed in a load status of the dispatching sequence. A load status car at the first landing will respond to basement car calls until it is given an up dispatch signal but will not respond to basement hall calls.

Basement car calls are registered by closing push button contacts CC at line 68 of FIG. IV to energize relay BS. Contacts BS are then closed at line 65 to energize relay BS1 and in turn BS2 through closed contacts BS1 at line 66. Contacts BS at 124 are opened to prevent the resetting of the direction throwover relay RL when brush 645 engages first terminal contact 643. Thus, the car remains set for down travel even when stopped at the first terminal and is reset for up travel by energizing lower coil RL when contact 644 is engaged and the car is at the basement.

Relay BS1 indicates the presence of a call below the car if it is above the basement by closing contacts BS1 at line 63 to energize relay CBD. Contacts BS1 at line 69 close to provide a holding circuit for relay BS until the car signals are reset by opening contacts RB at line 70. Back contacts BS1 at line 73 are opened to drop out the basement service timer BST and thereby deenergize relay BSTA so that the basement service interval during which a car is responsive to hall calls for basement service is terminated. Contacts BS1 at line 113 energize the car start circuits while the car is at its lower terminal and set for travel downward. Contacts BS1 at line 129 close to enable a car which has been set for travel upward by energization of its upper RL coil to be reset for travel downward by energizing its lower RL coil upon the closure of contacts MG.

Relay BS2 closes its contacts at line 15 to maintain a holding circuit for the basement car button while the car is at the bottom terminal, thereby preventing the lockout of that car button. It closes contacts BS2 at line 255 to light the down hall lantern at the first landing and opens the circuit enabling a basement up hall call to institute the travel of a car downward by opening contacts BS2 at line 215. Back contacts BS2 may be provided to open and remove from the dispatching sequence a car which is to provide basement service by completing the break of the circuits through which the next and load relays CUN and CUL (not shown) are energized as was partially accomplished by the opening of contacts BSTA. Relay BS2 may also be utilized to remove the car from the group available for dispatching upon which the dispatching interval is based.

Relay BU at line 215 of FIG. VIII cannot be energized if any car is in service (has its group service back contacts GSA at line 216 open), is below the second landing (has its above main floor contacts AMF at line 214 open), and is subject to a basement service call (has its contacts BS2 at line 215 open). Relay BU is the medium for instituting basement service in response to either an up hall call from the basement or a down hall call from the first landing. Hence, if a car is to serve the basement and is in a region where it will reach the basement promptly, another car will not be actuated for basement service by a hall call.

Hall calls for basement service can be registered as a first landing down hall call by closing contacts 1D at line 145 to energize relay S1D or as an up basement hall call by closing contact CU at line 151 to energize relay SBU. Relay S1D energizes relay SBU if it has not already been energized by closing contacts S1D at line 152. It also energizes an auxiliary relay S1DA by closing contacts S1D at line 218 and indicates the presence of a first down hall call at the starter's panel. When the system is on the night program and the next load car has its door reclosed, S1DA contacts causes that car to reopen its doors by opening back contacts.

Relay SBU opens its actuating circuit at line 152 by opening back contacts SBU, closes contacts SBU at line 215 to energize relay BU if the above enumerated conditions are met, and actuates an indicator on the master control panel.

When energized, relay BU enables a next up load car to be assigned for basement service by energizing BS through closed contacts CUN, BU and TO at line 71. The energization of relay BS enables basement service when actuated by relay BU in the same manner as set forth above for its actuation by push button contacts CC.

Additional circuits which function in accordance with car position are shown in FIG. VII. The circuits from lines 184 to 194 operate off the floor selector car position contact lanes so that significant car positions are indicated by relay operations. When a car is in service (has its contacts GSA closed), and is not subject to a dispatch failure to open contacts FD, brush 653 of the car position lane of contacts on the floor selector is active. Bottom dispatching floor relays MG, MGA and MGX are energized while the crosshead is at the bottom dispatching landing position on the floor selector by engaging its contact 654 with brush 653. Similarly, top dispatching floor relay MG1 is energized when the crosshead is at the top floor and contact 655 is engaged by brush 653 as shown if contacts H2B of the "balanced" program relay are closed. As the crosshead runs down from the top landing, brush 653 engages contact 656 with down field contacts DF2 closed at line 187 to energize down car run relay BDR. Up car run relay BUR is similarly energized as the crosshead runs up from the main landing to carry brush 653 into engagement with contact 657. The contacts 656 and 657 for each car of the bank are connected in parallel through arrow-headed leads 658 and 659 so that the departure of each car from those landings actuate the car run relays. If basement run relay BR is energized so that back contacts BR are open or if the car is not traveling upward so that up field relay front contacts UF2 are open at line 188, relay BUR is not energized by passage of those cars. Basement run relay BR is energized when the floor selector brush 653 engages contact 660 as the crosshead moves downward from the main landing. A holding circuit for relay BR is provided through the above main floor back contacts AMF and up load relay back contacts CULB at line 194. Relay BR when energized closes contacts BR at line 194 and seals itself in until the car runs up to the second floor and opens back contacts AMF.

The circuits of FIG. VII are fed from main leads 663 and 664 which are coupled to an alternating current source. Certain of the elements coupled to those leads are common to all cars of the elevator bank and are therefore connected in parallel to the cooperating elements of the individual cars by arrow-headed leads. The relays BDR and BUR, as well as the family of hall call relay contacts STD to S1U and the relay SS and the cooperating contacts H4, SS and J2 are common to all cars. These circuit elements are interconnected for the several cars by means of their floor selector contacts in their respective highest call circuit contact lanes by arrow-headed leads. Arrow-headed leads 665 are connected to the respective car brushes 653 to render those brushes effective through contacts FD at line 185. Leads 666 connect the contacts of the several floor selectors to appropriate junctions in the lane of normally closed hall call contacts employed in sensing calls above the cars.

The circuits including contacts CDD, EM, LSA and MG located at lines 183 and 184 connect the car position brush 653 to the top terminal relay MG1 under certain conditions. This enables the restarting of the motor-generator sets of the cars despite their presence at an intermediate floor by simulating their presence at the top landing and effectively utilizing the top dispatching and selecting equipment. The operation of these circuits is explained in detail in the aforementioned co-pending application Serial No. 808,290, entitled "Elevator Controls," by Raymond A. Burgy, filed March 30, 1959 and assigned to the same assignee as this invention.

The car position circuits from line 170 to line 184 are represented fragmentarily. The presence of the car at its highest call is sensed in this circuit. In practice a hall call relay contact for each of the floors above the lower terminal is included in the family of back contacts comprising up hall call contacts S1U for the first floor, down hall call contacts STD for the top floor and up and down hall call contacts for each intermediate floor served by the car. A junction between each of the up and down hall call contacts for each floor is coupled to a highest call floor selector machine contact 667 for each car in the elevator bank. Further, a similar contact is connected to the junction between the contacts S1U and S2D. A floor selector brush 668 for each car is connected through a chain of contacts to a highest call relay HCT, to lead 669 and thence through parallel down dispatch hold relay contacts DFDA and "balanced" program relay contacts H2 at lines 176 and 177 to lead 664. Each car has its highest call relay HCT connected through contacts DFDA and H2 by means of arrow-headed lead 670.

A car call above the car energizes car signal direction relay CBA shown in FIG. IV, as described, to open back contacts CBA at line 174 and bar operation of relay HCT. In the absence of a car call for that car for a landing above the car contacts CBA are closed and the circuit is able to sense the presence or absence of hall calls above the current effective car position. If it is not set for bypassing calls contacts BP at line 174 are closed. The accelerating relay AA is energized when the car is approaching the floor and is deenergized during the stopping sequence, so that contacts AA at line 174 are closed when brush 668 first engages contact 667. Relay VR2 is energized prior to the dropout of relay AA in the stopping sequence and is dropped out before contact AA as line 174 closes in starting. Thus, a circuit from relay HCT through contacts AA, VR2, UF2 and CBA can be completed only during a brief portion of the car stopping interval.

The highest call circuit is made effective only during up travel by closure of up field relay contacts UF2. Further it is not effective on an "off peak" or balanced program since back contacts H2 at line 209 are open at that time, unless the down dispatch timer hold relay is energized to close contacts DFDA. Thus, under normal operation, relay HCT is energized to signify the absence of any call above the car which can be served by the car when brush 668 engages a contact 667 which is connected through the contacts above it to lead 663, e.g. through closed back contacts STD, S9U, S9D and S6U in FIG. VII to contact 668 at line 173. Brush 668 is coupled through relay HCT to line 669 through closed contacts BP, AA and UF2 and back contacts VR2 and CBA at line 174, lead 669 and either contacts DFDA or back contacts H2 at lines 176 and 177.

Program selection relay contacts PS4A and up dispatch timer contacts J2 at line 181, contacts SS at line 180 and contacts H4 at line 179 all function in a "night service" program in connection with the operation of landing call indication relay SS. Generally relay SS is energized when no hall calls are registered since a circuit is completed from lead 663 through the family of normally closed hall call relay contacts and relay SS to lead 664. When a hall call is registered it opens one contact in the family to deenergize relay SS indicating its presence.

A high call reverse relay HCR (not shown) resets a top dispatch timer by energizing relay BDR at line 186 when the "off peak" program is in effect so that contacts H2 are closed, by closing contacts HCR at line 186. The energization of highest call relay HC (not shown) by contacts of relay HCT further insures the stopping of the car by closing contacts HC at line 160 to energize high call slowdown relay SD if the highest call is a down hall call, thereby insuring the energization of relay HCR. The hall call stopping relay S is energized through contacts HC at line 154 as the down signal direction relay is energized to close contacts DL in line 154.

During the stopping operation for a highest call which is a down hall call, relay S is maintained energized until the brake is set and while contacts RH3 at line 155 are open by closed contacts S and advance motor stopping relay contact BR1 both at line 153.

Throughout the preceding discussion it has been noted that certain elements function in one manner when the car is set for automatic operation and in another manner when it is set for operation by an attendant. Each car is provided with an individual attendant throwover switch to enable all or only a portion of the cars to be operated by attendants while any cars without attendants operate automatically. An attendant throwover switch TO comprising a motor driven unit having limit contacts arranged to disable the motor when it has actuated the contacts may be used for this purpose. The contacts TO are illustrated in the condition for automatic operation throughout the drawings.

Fragmentary hall lantern circuits for a typical car are shown in FIG. IX. Indicators for the top and bottom dispatching floors are connected across supply leads 716 and 717 by means of relay contacts. The top floor is illustrated as the upper dispatching floor, hence it is provided with a down travel indicating lantern 718 only at line 240. This lantern is illuminated while the car maintains the down load assignment by the closure of down load relay contacts CDL. Similarly, a car travel indicator in the form of a "This car up" sign 719 located at the lower dispatching terminal is illuminated at line 246 when up load relay contacts CULB at line 247 are closed if the car is at the lower terminal as denoted by the closure of the lower terminal car position relay contacts MGA, and if a door reclosing feature implemented by relay CL4 is not effective to open contacts CL4 at line 241.

The remainder of the car travel indication functions are performed through up and down car travel indicator brushes 720 and 722 carried on the crosshead of the floor selector for each car in cooperation with up and down car travel indicator contacts 723 and 724 situated in respective lanes on the floor selector. A typical up travel indicator 725 is shown at line 244. It is illuminated when the car is set for up travel and brush 720 is in engagement with its contact 723 by the closure of contacts RL at line 244 and the opening of back contacts RL at line 252. A down travel indicator 726, for example at line 252, is illuminated with direction throwover relay RL in the opposite condition, with contacts RL at line 244 open and back contacts RL at line 252 closed, when the brush 722 has engaged its contact 724. The interval of illumination of a travel indicator at a landing is from the moment the advance motor relay drops out closing back contacts AMR at line 242 as the car controls initiate the stop at that landing until back contacts CSA are opened at line 243 just prior to the closing of the car doors. These travel indicators will not function if the car has malfunctioned in a manner to deenergize the protective relay and open contacts LP2 at line 244, if the car is set to by-pass so that contacts BP are open at line 244 and is required to stop for a car call, or if the car door reclosing is effective at the lower terminal to open contacts CL4.

Basement service requires special provisions in the travel indication circuits since the car is normally dispatched from a floor above the basement. The up lantern 727 for the basement is lighted while the car is at the basement and set for up travel through lead 729 when the direction throwover relay has been operated. The "this car up" indicator 719 is lighted by a car traveling upward from the basement when brush 720 engages contact 723 at line 246, if the up basement service relay BR is energized to close contacts BR and the car gate has begun to open so that contacts GA are closed. A basement serving car according to the illustrated system remains at the first floor or lower dispatching landing for the standing time employed at any intermediate floor without being introduced into the dispatching sequence.

The dispatching sequence for the illustrated system involves selection of a car at a terminal as a next load car, assignment of that car to a load status, and dispatching. As a car arrives at the first floor and is selected it can be barred from a load assignment if it is to be sent to the basement. Under these circumstances, a down travel indicator 730 for the car is operated at the first floor even through the car has been set to travel upward by the closure of contacts RL at line 244 and the opening of contacts RL at line 252. Contacts CUNB at line 256 are closed by the up next car relay CUNB which is responsive to the basement service time relay contacts BSTA and the up next car relay contacts CUN at line 262. The contacts CULX at line 256 are closed by a load car control relay CULX at line 258 which is energized by closure of any of the CULC load car control relay contacts at lines 258 to 261 for each of the four cars. Therefore, the lantern 730 is illuminated and remains so until contacts BS2 are closed at line 255 so that the lantern 730 is maintained illuminated through brush 722 when the car is reset to travel downward and until the brush is moved from contact 724 at line 255.

Stopping time relay MGF at line 257 measures the intervals over which a car's advance motor is deenergized at other than terminal floors. These intervals are defined by contacts MGA, MG1 and GS at line 257 and AMR and CL4 at lines 242 and 241 all of which are closed. While the car is at the lower terminal, contacts MGA are open, and while it is at the upper terminal, contacts MG1 are open. Advance motor relay contacts AMR remain closed from the moment a car picks up a call for which it will stop to the moment the car gate is closed and the car advance motor is energized. Since the trip time of a car is a constant running time plus a variable time for stopping at landings, this relay indicates an interval which is a measure of the variable portion of car trip time. The stop time for each car when integrated for the system influences the operation of a number of system controls as was fully described in the above referenced copending application Serial No. 808,290, filed March 30, 1959, entitled "Elevator Controls," by Raymond A. Burgy and assigned to the same assignee as the present invention. Thus, the dispatch interval can be altered in response to variations in an element of trip time or of travel time over a portion of a trip to provide a car distribution calculated to better serve the structure even before the first car subject to the new demand has complete its current trip. Further, changes in these intervals may be employed to alter the operating program of the system automatically as was described in the above referenced copending application Serial No. 808,290.

One method of dispatching cars in an elevator system such as the four car illustrative system as shown will be discussed briefly. Up dispatch relay KU at line 208 of FIG. VIII can be of the magnetic latch type wherein energization from lead 827 to lead 828 pulls in its armature while energization from lead 829 to 828 drops out its armature, and energization from both leads 827 and 829 to lead 828 causes the pull-in action to predominate. Main leads 830 and 832 for this circuit are supplied by alternating current, therefore, a rectifier 833 is included in lead 828 to enable the utilization of a highly sensitive direct current type of relay for relay KU. The cars can be dispatched by completing a circuit from lead 830 to lead 827. Closure of activating switch 834 and up dispatch switch 835 at line 207 as by buttons in the starter's panel energizes relay KU as does the coincident closing of up dispatch timer holding relay back contacts DFU and up dispatch timer relay contacts J3 at line 208, or the coincident closing of up dispatch timer reset relay contacts DFUL and DFUT at 209 and up dispatch relay reset timer contacts KUT at line 207. Normal automatic dispatching is effected upon the closure of contacts J3 a fixed interval after the previous dispatch signal or departure of the preceding car while back contacts DFU are closed, whichever occurred later. A more detailed description of the dispatching sequences and dispatching in general of a four car system herein illustrated and as discussed in this application is to be found in the above referenced copending application Serial No. 808,290, filed March 30, 1959, by Raymond A. Burgy.

Up dispatch timer hold relay DFU is normally deenergized by open up dispatch timer relay contact J2 at line 212. However, contact J2 is closed a predetermined interval after the initiation of an up dispatch interval timing operation and is held closed until the reset of the up dispatch timer. During the latter portion of the interval, relay DFU will be energized if no car has a load assignment either because it has not been assigned or has been removed from the assignment for basement service. Under these conditions the back contacts CULB at line 211 are all closed to energize auxiliary up dispatch timer holding relay DFUA and close its contacts at line 212. These contacts complete an energizing path for relay DFU. If no call to which the up load car can respond, as a car call in that car or a hall call, is registered throughout the interval, contacts J2 are closed and relay DFU is energized to bar release of the load car by relay KU. In the absence of a hall call to open one of the series of hall call relay back contacts at lines 170 through 184 of FIG. VII, landing call indicating relay SS is energized to close its contacts at line 210 and partially complete the circuit for relay DFU. If relay SS is deenergized by a hall call, it opens the energizing circuit for relay DFU at line 210. When a load car is assigned, its up load relay back contacts CULB in line 209 are opened so that the energizing path for relay DFU can be broken by registration of a car call to open its CB contacts at line 210.

When up dispatch timer hold relay DFU is deenergized by either a car or a hall call, up dispatch relay KU is energized the instant up dispatch timer contact J3 is closed. A contact of KU is then closed to energize the up dispatch relay CUD of the load status car. A car on automatic operation will have its motor generator set started without reliance on any other condition in the primary starting circuits when contacts CUD are closed in the motor generator set start circuits. The auxiliary up dispatch relay CUDA is energized with CUD to energize an up dispatch starting time relay STT on closing contacts CUD. A holding circuit for the up dispatch relay is established by closing contacts CUD to maintain the relay energized until that car leaves the first floor and denergizes its MG relay to open the holding circuits.

Relay CULB is barred from energization while the car is subject to dispatching since it is not necessary to operate the dispatch timer holding circuits at lines 209 and 211 at that time. The load car indicator in the hall at line 247 of FIG. IX is deenergized upon the issuance of a dispatch signal to the car. This extinguishes the "this car up" lamp for the dispatched car.

In order to avoid closing the doors of the dispatched car on an entering passenger who was attracted to the car by the "this car up" indicator which was just previously extinguished, the door is held open by up dispatch starting time relay STT for an additional brief interval following the energization of relay CUD which may be several seconds. This relay began to time out at the instant CUDA was energized. At the end of its timing interval it completes the car starting circuits of FIG. V by closing contacts STT at line 108 to connect lead 584 with lead 586.

When top terminal dispatching is utilized, it parallels that described above in many functions although it is considerably less complicated where no floor can be served above the top terminal, as in the present example. Down dispatching circuits for such a system are shown in the above referenced copending application Serial No. 808,290, filed March 30, 1959, entitled "Elevator Controls," by Raymond A. Burgy. The arrival of a car at the top terminal closes its top dispatching floor relay contacts MG1 in its down load car relay CDL and down dispatch relay CDD circuits and closes contacts MG1 in its down rotary dispatch selector circuit. If its down dispatch relay back contacts CDD are closed and no down load car is assigned to open its back contacts CDL the down rotary dispatch selector (not shown) is energized and rotates its armature shaft to sequentially close four contacts RDSD. When the RDSD contacts for a car whose MG1 relay is energized are closed, its down load assignment is effected by energizing its relay CDL to open the RDSD circuit through back contacts CDL and to stop the armature in a position maintaining the RDSD contacts for that car closed. Down load relay contacts CDL are closed to energize auxiliary down load relay CDLA for that car, contacts CDL are closed to light the car's down hall lantern 718 at the top floor, and contacts CDL are closed to energize a down scheduling relay reset timer DFDT and a down scheduling relay reset relay DFDL.

Auxiliary down load relay CDLA conditions the down dispatch relay CDD for the car for energization by closure of down scheduling relay contacts KD by closing contacts CDLA. It enables relay KD to be energized by opening the energizing circuit of down dispatch timer holding relay DFD at line 201 of FIG. VIII so it can be deenergized under proper conditions. These conditions correspond to those required at the bottom terminal in that during the interval down dispatch timer contacts K2 at line 203 are closed a car must have a load assignment as signified by the opening of one of the auxiliary down load relay back contacts CDLA at line 200 to deenergize auxiliary down dispatch timer holding relay DFDA and open its contacts at line 203, and must have either a hall call registered as indicated by open contact SS at line 201 or a car call registered in the load car so that a parallel pair of back contacts CDLA and CBD in lines 201 and 202 are both open for that car.

When relay DFD is deenergized its back contact is closed at line 205 so that upon completion of the down dispatch interval the closing of down dispatch timer relay contacts K3 energizes down scheduling relay KD. This relay can be energized manually by closing activating switch 834 at line 207 and down dispatch switch 838 at line 206. Relay KD corresponds structurally and functionally to relay KU and is reset by energizing lead 839.

In the past, it has been necessary to prevent the dispatching of more than one car in a bank at a time and to measure the delay in car operation so that the controls can be altered to permit subsequent cars to leave the terminal if the first car has delayed excessively. The interlocking of cars has been eliminated in the present system without loss of the means permitting the dispatch of but one car upon the issuance of a dispatch signal. When the down load relay CDL of a car is dropped out by operation of its down dispatch relay CDD, contacts CDL are opened to deenergize relays DFDL, and DFDT. Relay DFDT is of the slow drop out type so that its contacts at line 203 of FIG. VIII hold in momentarily while back contacts DFDL at line 203 close thereby resetting down scheduling relay KD by energizing lead 839. When relay DFDT drops out it closes its back contacts to energize the down rotary dispatch selector RDSD. The rotary dispatch selector then operates to select another load car which, when selected, remains in that status until the end of the next dispatch interval. At the end of the next interval the load car is dispatched without regard to the previously dispatched car. Thus even if the previously dispatched car is held, as by operating the door safety circuits, or other malfunctions, the system cannot lock up and requires no supplemental failure timing to correct such lockups.

Similarly, the up scheduling relay KU is reset by activating lead 829 through contacts DFUL and DFUT at line 209. Upon energization of an up dispatch relay CUD the up load relay CUL of a car is dropped out by opening back contact CUDA to deenergize DFUT and DFUL. Relay DFUT drops out after a delay to open contacts DFUT at line 209 while contacts DFUL in series therewith are closed immediately to energize briefly the reset winding of the up scheduling relay KU. The up dispatch is maintained on the car through CUD holding contacts.

A car having its CUN relay energized is advanced to load status as the load status of the preceding car is canceled upon the closure of back contacts DFUT. Another car is given the next assignment when RDSU causes its CUN relay to become energized. The up dispatch timer runs from the resetting of relay KU so that at the end of the next interval it again closes KU contacts to energize up dispatch relay CUD for the new load status car even if the up dispatch relay of a previously dispatched car is energized.

On an off hours program the car retains the up load assignment while away from the floor, hence, when a dispatch signal is issued to the load car, back contacts CUDA are opened to drop out relay CULB. This opens contacts CULB for that car permitting relay DFUL to drop out. Back contacts DFUL are closed at line 209 of FIG. VIII to complete a reset circuit for up scheduling relay KU with contacts DFUT of the still energized relay DFUT. Another load status car is dispatched at the next interval if the dispatched car fails to leave the terminal even though its load assignment was maintained during the interval since energization of relay DFU opens its back contacts to open the load assignment holding circuit. The next car would then be given the load assignment through the conventional circuits when relay DFUT dropped out and it would be dispatched at the end of the interval by the closing of contacts J3 at line 208.

During an off peak or balanced program, the control functions at the terminal are modified to avoid accumulating cars at one end of their travel. On all but the off hours program the "off hours program" back contacts H4A are closed to activate circuits measuring the number of cars available at the dispatching floors. Relays BD2 and BD3 (not shown) measure the presence of two and three cars respectively at the top terminal. The presence of these cars is indicated by the closure of their MG1 contacts. This permits a current to flow between the alternating current supply leads which is a function of the number of cars present since each of the contacts has a resistor in series. When two of the parallel resistors are connected between the direct current leads the current is sufficient to pull in relay BD2, and when three resistors are connected in parallel the threshold level for relay BD3 is also exceeded. In order to insure the drop out of relays BD2 and BD3, back contacts BDR in series with the parallel circuits are opened each time a car leaves the top terminal thus requiring the relays to be pulled in again. Similarly contacts MG function when the cars are at the lower terminals to connect parallel resistors between the direct current leads whereby neither relay BU2 or BU3 is pulled in with one car present but the arrival of the second car pulls in relay BU2 and of a third car brings in relay BU3. Each of the up two car and up three car relays are reset as a car leaves the lower terminal floor traveling upward by virtue of the opening of back contacts BUR in series with the parallel resistor circuit.

When top dispatching is effective as in the off peak program, the arrival of a second car at the top dispatching terminal energizes relay BD2 to open back contacts BD2 at line 201 of FIG. VIII and deenergize relay DFD so that the timer is permitted to time out. This timing is accelerated if the traffic is at a moderate level so that down dispatch expediter relay K4 is energized, and if below that level it expires in a normal interval.

The presence of three cars at the top or bottom terminal causes the next dispatch signal to start two cars away from the terminal on the off peak program. The circuits effecting this are shown in FIG. VIII. When three cars are present at the top terminal, contacts BD3 at line 219 are closed to energize down scheduling relay reset timer KDT through closed program contacts H2. Three cars at the lower terminal will similarly energize up scheduling relay timer KUT through closed contacts BU3 at line 220. As the dispatch timer times out and a car responds to the dispatch signal as by starting away from the terminal, the scheduling relay KD or KU is normally reset by the closing of contact BDR at line 204 for relay KD or BUR at line 210 for relay KU through the energization of their respective reset coils. Similarly, when a car is late at the top floor relay KD is reset as it is high call reversed by the momentary energization of relay BDR through contacts H2 and the high call reverse relay contacts HCR at line 186. This function ordinarily prevents a second car from being dispatched until a full dispatching interval has expired after the departure of the preceding car. However, when relay KDT is energized, the departure of a car from the top terminal energizing relay BDR momentarily, simultaneously energizes the pick up and reset windings of relay KD so that relay does not drop out. Relay KDT is of the flux decay type, hence, although it is deenergized by relay BDR through relay BD3 its contacts KDT hold in until after relay BDR drops out and the first reset impulse from BDR has expired. As the next down car is advanced to down load assignment it encounters a completed down dispatch assignment through the still latched-in relay KD and is started downward. However, at this time the relay KDT is dropped out since relay BD3 is not reenergized when only two cars are at the terminal. Hence, the closing of contacts BDR at line 204 by the second departing car resets relay KD so that a full timing interval is required before the last car will be dispatched.

The up dispatch of two cars from the bottom terminal when three are accumulated is effected similarly. Contacts KUT close at line 207 so that the first car departing upward does not release the latch of up scheduling relay KU. By the time the second car departs upward, contacts KUT have dropped out and relay KU is reset by relay BUR at line 210 to impose a full dispatch interval on the third car.

Under the off hours program all cars have their doors reclosed at the lower terminal after they have remained open a sufficient interval to enable the passengers who may have ridden downward to leave the car. This interval requires the successive timing out of the standing time saver relay TRL and start time relays TR and TR2. No load car indication is exhibited at the lower terminal although all cars are parked at that terminal. After the cars have remained for a given interval at the lower terminal their motor generator sets are shutdown. The load car at the time of switch over to off hours service is the preferred load status car. Load assignment is maintained on that car while away from the lower terminal floor unless an up hall call from that floor is registered or a hall call is in registration when the load car has been away from the floor the portion of the dispatch interval defined by the operation of relay J2. If the load assignment is transferred to a second car, that car retains the assignment until it returns to the first floor. However, if two or more cars are placed in operation, the first of those cars to return to the terminal is then given the load assignment, and its doors are retained open until all other cars have returned and reclosed their doors. At that time the load car doors are reclosed.

Any car which returns to the lower terminal takes over the up next car status from the current up next car if that car does not have its motor generator set running. If another car has its set running and has therefore maintained the next car status, the returning car will be placed on standby status with no assignment unless that next car has its doors reclosed.

This concentration of next and load assignment on cars with open doors is calculated to avoid confusion of passengers as to the car which they should enter at the lower terminal since once a car receives a load assignment while available to passengers at that terminal it is not shifted under any circumstances until it is dispatched. Further, by concentrating traffic in a preferred load car the starting and stopping of motor generator sets is reduced to a minimum. Passenger inconvenience is avoided without disrupting the preferred mode of operation, even when a passenger enters a recently returned non-load car whose doors are thereafter reclosed since all cars which are not placed in the load status are immediately responsive to car button calls on the off hours program.

The load car is conditioned for service above the lower dispatching terminal and the next up car is arranged to serve floors below that terminal. Accordingly, the load car is responsive to all hall calls but a first down or a basement up hall call and the next up car is responsive to those calls. An up next car with its doors reclosed opens them for a first down hall call, and, if its motor generator set is shutdown, it starts its set in response to any hall call for basement service.

Relays S1UA and S1DA are first hall call auxiliaries, as shown on FIG. VIII at lines 217 and 218 which are energized directly by the first hall call relays through contacts S1U and S1D respectively.

In order to avoid the starting of a car away from the floor when the doors reclose, auxiliary gate relay GA at line 104 is deenergized by door reclosing timer relay back contact CL4. This timer is of the slow dropout type to insure a positive sequence of door reopening prior to conditioning the car for starting when a first floor hall call is registered. Thus, the car start circuits are opened behind contacts GA at line 110 by back contacts OPB at line 112 of the door opening controls which open before CL4 drops out to energize GA. Even if the gate has not opened sufficiently to open limit switch 59S at line 103 at the time CL4 closes the gate relays have no effect on car starting until the car doors are fully opened and relay OPB is deenergized. The doors are started closed in the usual manner after they have been reopened.

Once the doors of a car are reclosed, motor-generator set shutdown timing is initiated by closing contacts CL4 to energize motor-generator set shutdown timer MGT. After an interval of several minutes timer MGT opens its back contacts so that rectifier disconnect relay RE is no longer sealed in through motor-generator run relay contacts LR. The next and load car motor-generator sets are also shutdown in this manner since their closed contacts CUN and CUL are behind opened back contacts CL4. Thus, the next and load car sets are shutdown if they are inactive for the timing interval of MGT and are restarted in response to a conventional dispatch signal through contacts CUD, car button signals through contacts CBD or CB, or by the dropping out of back contacts CL4 for the load or next cars. In order that car buttons for floors above the lower terminal are maintained effective while a car has a "next" assignment and its doors are reclosed, door reclosing relay contacts CL4 are closed at line 56 to by-pass the open back contacts CUN at line 55.

Door close buzzer time relay BZT is deenergized by opening back contacts CL4 at line 120 to maintain a door motor holding timer energizing path through closed back contacts BZT and contacts CL4 when the doors are reclosed.

While the doors are reclosed, the floor hall lantern indicators are disabled by opening back contacts CL4 at line 241 of FIG. IX.

Door reclosing relay contacts RCL are closed at line 104 of FIG. V to render the car starting circuits responsive to a car call as contacts CB are closed.

When off hours service is instituted, at least one car is at the lower terminal and is subject to an up load assignment. Thereafter, throughout the off hours interval that car is preferred for load assignment and sustains the major service burden. Assume car D is the preferred up load car, that all of the cars are parked at the lower terminal that all of the car doors have been reclosed, and that a hall call is registered above the lower terminal. Relay SS at line 181 of FIG. VII is deenergized to release up dispatch timer holding relay DFU so that after an appropriate interval contacts J3 at line 208 are closed to energize up scheduling relay KU so that up dispatch relay CUD(D) for car D is energized. No change in "next" status can occur since closed contact CUL(D) maintains relay DFUT energized thereby barring advancement of the "next car" to load car status, and since no "next" vacancy occurs selector RDSU is not released to close another "next" relay circuit. When car D fulfills the requirements of its initiating call and any others it may encounter, it returns to the lower terminal, still as the load car, opens and recloses its doors and awaits the next call for service.

The load status can be taken from car D under either of two conditions. If an up hall call at the lower terminal had been registered while car D was away from that terminal, back contacts S1U would have been opened momentarily and then reset by the presence of the other cars at the terminal. This would interrupt the load assignment holding circuit. A hall call which deenergized relay SS to open contacts SS at the time the dispatch timer holding relay DFU was energized also interrupts the hold circuit. Relay DFU can be energized only after contacts J2 at line 212 have been closed by the dispatch timer; hence, a substantial interval is afforded for the load car to answer calls before this transfer occurs. Relay DFU is energized by contacts DFUA at line 212 which is energized despite the maintenance of a load assignment on car D since back contacts CULB(D) closed as the car left the lower terminal by virtue of the opening of contacts MG(D). Thus car D relinquishes its load assignment permitting relay DFUT to drop out so that the "next" car, assumed to be car B, is given the load assignment and dispatched on the closing of contact J3 at line 208. Another car, car C is selected as next by operation of selector RDSU as car B is transferred to the load status hence all assignments are again completed.

The next up car, that car having its CUN relay energized, serves hall calls for basement service. A first down hall call energizes S1DA at line 218 to open the energizing circuits for door reclosing at back contacts S1DA so that the car having its CUNA back contact open drops out its CL4 relay. The door of the next car then opens by energizing door opening slowdown relay OPS through back contacts CL4. The doors initiate their opening cycle prior to the energization of the starting circuits. Relay S1D energizes hall call relay SBU to energize basement service relay BU at line 215 and thus basement service relay BS at line 68 for the next up car for conventional basement service. In turn relay BS1 is energized to reset the car for down travel through closed contacts BS1 at line 129 and contacts MG, since the car is at the first floor by energizing lower coil RL and thus down signal direction relays DL and DL1 (not shown). Contacts DL1 and BS1 are thereby closed in the car start circuit at line 113.

A basement hall call operates a similar sequence by causing the operation of relay SBU to energize DL1 and BS1 for the next up car and cause it to travel to the basement. However, door reclosing is not cancelled prior to the start of the car under these circumstances and the car doors open only upon its arrival at the basement landing. In the same manner a basement car call will energize DL1 and BS1 to cause any car in which it is registered to travel downward.

If all motor-generator sets are shutdown during off hours service the load car set is restarted upon the closure of up dispatch relay contacts CUD. However, no dispatch is given a next up car to send it to the basement and therefore a supplementary means of starting its set must be provided. This means is actuated by the deenergization of its CL4 relay which closes back contacts to enable a start circuit through closed up next car relay contacts CUN. Deenergization of relay CL4 is accomplished directly upon the registration of a first down hall call through the opening of S1DA. An up basement hall call operates BS for the up next car and pulls in its car signal direction relay CBD to close a motor-generator set start circuit. Again the car will start without opening its doors since its DL1 and BS1 contacts at line 113 are closed. When the set is started power is applied to the circuits of FIG. V to energize relay EM through contacts LR, the safety switches, and closed contacts RH1 and DO at lines 101 and 102. The car is started without reopening its doors since CL4 is not dropped out by a basement hall call and back contacts CL4 in the door reopening circuits are held open. The balance of the starting circuits are as previously described.

Means for establishing dispatching intervals at the top and bottom dispatch terminals are shown in FIG. XII fed from an alternating current source over leads 850 and 851. The uppermost circuit designated generally at 853 of FIG. XII integrates the proportion of the time each car is stopped to establish what will be termed an integrated stopping time for cars. This circuit measures stop time for both directions of travel. The lower circuit 854 of FIG. XII measures the number of cars subject to dispatching.

Circuit 853 establishes a signal which represents the proportion of the time that cars in the system are stopped at landings intermediate the dispatching terminals. The level of elevator utilization is related to the stopping time since that time is a function of the number of stops as well as the length of individual stops in a system having the standing time control described above. Thus, a single passenger entering or leaving an uncrowded car makes his passage between the car and landing more rapidly than when the car is crowded, and a plurality of passengers will require a proportionally greater interval to transfer between the car and landing. Since the door closing operation is timed from the last passage through the doorway, a low level of traffic will expend a lower proportion of the time stopping at floors than a high level of traffic. The significant timing range for stops can be chosen to best suit the needs of the utilization. As illustrated, a system having upper and lower dispatching terminals wherein service to floors beyond those terminals is required only occasionally need not monitor stops at the terminals, such stops being controlled primarily by the dispatching circuits rather than by car utilization, or stops at landings beyond the terminals. The illustrated system is arranged to minitor only stops at floors intermediate the dispatching terminals as defined during the interval the contacts MGF for the individual cars are closed. It is to be recognized that it is within the scope of this concept to monitor other stops than those intermediate the terminals or to selectively introduce other stops as effective in this control under certain conditions, as by monitoring stops at a terminal under an operating program wherein timed dispatching is not utilized at that terminal.

Stopping time ratio relays R1, R2, R3 and R4 are successively energized as the integrated stopping time increases. At very low levels of stopping time none of the relays are energized. At the first effective level, relay R1 is energized then R2 and so on. Relays R1, R2, R3, R4 are connected in series in a cathode follower circuit of triode connected pentode 857. This pentode is supplied with filament heater current from secondary 858 of transformer 859 while its plate potential is furnished by secondary 860 through rectifier 862 and smoothing condenser 863. Integrated stopping time of the several cars in the bank is represented as a charge on condenser 864 connected in series with a parallel rectifier 865 and resistor 866 across resistor 867 forming a portion of a voltage divider connected across the plate supply.

The variable portion of the voltage divider comprises four resistors 868(A), 868(B), 868(C) and 868(D), conveniently of equal value where equal weight is to be given to the stops made by each of the four cars. These resistors are selectively connected in series with resistor 867 and the circuit connected across it during the stopping interval of the respective cars. When no cars are stopped, no potential is applied to lead 869 by the plate supply. Stopping of a single car connects lead 869 to the plate supply through a single resistor 868 to impose a potential on lead 869 which is a function of the relative magnitudes of resistors 867 and 868 and the charge on condenser 864. Two or more coincident car stops further increases the potential on lead 869 by further reducing the resistance between it and the positive or plate side of the plate supply.

The terminal of condenser 864 which is connected to lead 869 through rectifier 865 and resistor 866 is connected through lead 870 to control electrode 872 of pentode 857. Rectifier 865 offers a low resistance charging circuit for condenser 864 so that the condenser tends to develop the same potential across its terminals as is developed across resistor 867 at a rate which is a function of the resistance of the parallel forward resistance of rectifier 865 and resistor 866 and the capacitance of condenser 864. As potential on control grid 872 becomes more positive with respect to cathode 873 the current between cathode 873 and anode 874 increases. This increase for a given state in the system follows the exponential charging characteristic of condenser 864 to approach an asymptote. However, the system rarely maintains a given state for any appreciable interval since each car may be stopped over variable intervals separated by variable running intervls. Thus, during the stop of a given car one portion may coincide with a stopping interval by one other car and another portion by two or more other cars while there may also be intervals when no cars are stopped. Accordingly, when the system is subjected to substantial activity the potential on lead 869 is continuously varying toward one of five stable levels in a four car control.

The potential on lead 869 can also drop below that on lead 870 as at an instant when no cars are stopped following an interval during which condenser 864 has acquired a charge. The discharge rate of a condenser in a loop including resistance is a function of the magnitude of the capacitance and resistance, is generally exponential, and approaches an asymptote. Since rectifier 865 is poled in the charging direction it is essentially an open circuit so that essentially the full resistance of resistor 866 is effective to cause the potential on lead 870 to diminish at a lower rate than it was developed. The potential on lead 870 is thereby weighted to be maintained and is a function of the proportion of the time cars are stopped to close their MGF contacts.

This integrated proportioning of stopping time when initially below a first level has no effect on relay R1, R2, R3 and R4. When it attains the first level it energizes relay R1 to pull in its contacts R1 at line 224 of FIG. VIII and energize relay DS1. Contacts R1 are held in until the anode-cathode current in pentode 857 declines to a predetermined level below that required to close the contacts. Similarly, relay R2 has a pull in level greater than that for relay R1 and will drop out prior to the drop out of R1 so that it is pulled in only while relay R1 is pulled in. Relays R3 and R4 operate in a corresponding sequence. Their circuits are modified by shunting resistors 875, 876, 877 to enable them to pull in and drop out in the same range of currents as for relays R2 and R1. Thus a portion of the anode-cathode current through relays R2 and R1 is shunted around relay R3 by resistor 875 so that while relay R3 may pull in with the same current in its coil as that which pulls in relay R1, the shunting of a portion of the anode-cathode current greater than that which pulls in relay R2 requires a higher current to pull in relay R3. Relay R4 is energized by a still greater anode-cathode current yet is maintained in the same range of pull in current adjustment by shunting resistor 876.

When the number and/or lengths of stops increases the stopping time in the system to a level energizing relay R4, it closes its contacts at line 221 to energize relay DS4 at line 221 of FIG. VIII to close its contacts at line 331 and insert resistor 877 in parallel with relays R3 and R4. This further reduces the proportion of the anode-cathode current flowing through these relays so that relay R4 will drop out when the anode-cathode current is reduced to a lesser degree than would be required in the absence of the shunting path through resistor 877.

Relays R1, R2, R3 and R4 can be considered to signify the intensity with which the cars are being utilized. When they are used at a high intensity a round trip consumes more time since there are more delays due to the greater amount of stopped time. In dispatching, it is desirable to maintain the cars spaced in time so that cars depart from the dispatching terminal at regular intervals. Thus, in a four car system, ideally a car is dispatched from a terminal one quarter of a round trip interval after the dispatch of the preceding car. As the round trip interval increases the dispatch interval must increase if the cars are to be maintained in an even distribution. Similarly, as the number of cars in the dispatching sequence declines the dispatching interval should be extended so that with three cars it should be one-third of a round trip interval and with two cars one-half of an interval. The energization of relays DS1, DS2, DS3 and DS4 in FIG. VIII by relay contacts R1, R2, R3 and R4, respectively, is employed to effect changes in the dispatch interval in accordance with increases in stopping time. Relays OE3 and OE4 in lines 337 and 338 may be used to change the interval as the number of cars available for dispatching changes.

Dispatched round trips are between the dispatching terminals in the present system. That is, they involve dispatching a car from a lower terminal upward and dispatching it downward from the upper terminal. While the car is serving the basement it is not available to function on these round trips and therefore should not be considered to be subject to dispatching or available to the dispatching sequence unless the lower dispatching terminal is to be switched to the basement. Circuit 854 is responsive to the number of cars available to the dispatching sequence. It includes a plurality of parallel resistors 878 which are selectively connected to a common circuit to alter the current level in relays in the common circuit. When three resistors 878 are connected in parallel the current through rectifier 879 to lead 880 and from 880 through relay coils OE3 and OE4 to lead 851 is sufficient to pull in relay OE3 but insufficient to pull in relay OE4. When four resistors 878 are paralleled both relays OE3 and OE4 are pulled in yet when a resistor is disconnected relay OE4 drops out and when two are disconnected relays OE3 and OE4 are both dropped out.

In order to connect to resistor 878, the car must have its individual service relay GS energized to close contacts GS at line 335, 337, 339 or 341, and must not be assigned to basement service. Basement service can occur only while car position relay BS3 is deenergized; hence, if the car is above the position for energizing BS3 contacts BS3 and basement run relay contacts BR are closed at line 335, 337, 339 or 341. If a car is below the second landing so that BS3 is deenergized, its circuit is completed around contacts BS3 by back contacts BS2 at line 336, 338, 340 or 342 unless the car is assigned for basement service. When assigned for basement service back contacts BS2 are open since the car will not participate in the dispatching functions until it is released from its basement assignment. Basement assignment release can take place when the car is reset for up travel at the basement; however, an up traveling car which stops at the first terminal does not enter into dispatching. Accordingly, basement run relay back contacts BR are opened under these conditions until BS3 is energized to bar the connection of resistors 878 and during that interval omit the car from the summation by relays OE3 and OE4 of cars available for dispatching. It is to be appreciated that the number of cars and counting relays can be adjusted to best meet the needs of the system.

For a more detailed description of the utilization of the measure of stop time of the cars as a means for determining dispatch intervals and for changing the mode of operation into various programs such as up peak, down peak, etc., reference is again made to copending application Serial No. 808,290, filed March 30, 1950, by Raymond A. Burgy.

The conditions established by both stop time and number of cars available for dispatching is continuously monitored by this system and the current rate at which the dispatch intervals are running at any instant is a function of these two variables in the present system.

Certain aspects concerning the utilization of stop time to influence elevator operation and particular means for effecting control functions in response to stop time are disclosed and claimed in another copending patent application for "Elevator Controls" which was filed February 21, 1957, in the names of Joseph H. Borden and Raymond A. Burgy assigned Serial No. 641,693.

The demand for elevator service in different classes of buildings varies widely during different periods of the day as well as from day to day. In an ordinary office building the demand for elevator service is often classified into the four groups or classes of service commonly known as up peak, off peak, down peak, and intermittent or night service mentioned hereinbefore. The up peak demand occurs just before the start of a business day when the building tenants or occupants are arriving. After most of the tenants have arrived the demand subsides to an off peak demand with nearly balanced up and down traffic during the working hours. During the noon lunch period many of the occupants leave the building so there is a short period of heavy down traffic or down peak operation almost immediately followed by another up peak demand as the tenants return from lunch. During the afternoon an off peak program serves the ordinary balanced demand and then at the close of the business day there is usually another period of down peak demand. After this demand is satisfied and the offices are closed, there follows a period of light or intermittent demand during the evening and night hours during which a few of the building tenants may be entering or leaving and building maintenance personnel are using the elevators while going about their work. The traffic demand on holidays and Sundays is generally the same as the night demand since there are very few people using the cars. For efficient service it is necessary to change the operating pattern or program of a group of elevators as each type of traffic demand occurs. It is possible to do this by counting passengers or passenger transfers as well as by the hereinbefore discussed "stop time" measurement. Further, it is possible to sum the "transfer time" of passengers entering or leaving a car. That is, if a number of passengers enter a car through a door wide enough to accommodate more than one passenger abreast it is virtually impossible to distinguish and count each individual passenger, but it is possible to sum the "transfer time" of a number of passengers. However, only passenger count will be explained in detail hereinafter.

In the following description the term "passenger" is intended to include any person or object that is transported in an elevator car. The term "passenger transfer" means any movement of a passenger to or from the car.

In any elevator system in which the pattern of operation is to be controlled according to the number and direction of the passenger transfers it is necessary to provide some means for counting the number of passengers entering or leaving the car as well as determining the direction in which they are moving. Many types of passenger detecting devices may be employed for this purpose. Such devices include pairs of treadles mounted in the floor at the doorway of the car, electrostatic detectors similarly located, means for detecting changes in weight of the elevator car as a passenger steps into or from the car, and radiant energy beams directed across the doorway of the car in a position to be interrupted by a passenger entering or leaving. This latter form of detecting mechanism is preferred and is the type employed in the system illustrated in the figures. The detecting mechanism may be mounted on the elevator car or in the hallway door leading from the hall into the car. The location on the car is preferred since in such location the same detecting means is effective at each floor served by the car whereas if the detecting means is located in the hallway door separate means must be employed at each floor.

In the system shown in FIG. XI an elevator car 910 is shown in plan as being located adjacent a hallway door 911 with its car doors 912 retracted to open position. Hall doors 913 are also open to allow passage to or from the elevator car and the adjacent hallway.

A pair of radiant energy sources 915 and 916 that are energized through a transformer 917 connected to a source of alternating current power project beams 918 and 919 of radiant energy across the doorway of the elevator car to a pair of energy receivers such as photocell receivers PCC and PCL. The photocell receivers PCC and PCL, which are responsive to the radiant energy beams 918 and 919 respectively, include relay contacts arranged to complete circuits from a positive direct current voltage line L-1 through lead 920 to the receivers PCC and PCL and from the receivers through leads 921 and 922 to car and landing photo relays PC and PL respectively shown in lines 280 and 281. The landing photo relay PL responds to that beam of the pair of beams 918 and 919 which is nearer the landing regardless of whether its receiver PCL is on the car or on the landing. The contact arrangement in the receivers PCC and PCL is such that as long as the radiant energy beams 918 and 919 are unobstructed the relays PC and PL are energized.

Energization of relays PC and PL in lines 280 and 281 cause them to close their contacts PC and PL in line 282 to complete a circuit from the positive lead L-1 through these contacts and an operating coil of a direction sensing relay PH to a return line L-2. The direction sensing relay PH thereupon closes its contacts PH in line 283 so as to complete a by-pass circuit around the PC contacts in line 282. The landing photo relay PL in line 281, when energized, also closes its contacts PL in line 286 to complete the circuit to a landing auxiliary photo relay operating coil PLA in line 286. The landing auxiliary photo relay PLA when energized opens its contacts PLA in line 285 and when deenergized closes these contacts so as to, in cooperation with the car photo relay PC, complete or prepare a circuit in line 284 through normally open contacts of the direction sensing relay PH to provide a sealing circuit for the direction sensing relay PH.

In this arrangement the car photo relay PC in line 280 and the landing photo relay PL in line 281 are deenergized in overlapping succession as a passenger enters or leaves the car. These relays, since they operate each time a passenger enters, may be used directly with counting equipment to count the number of passenger transfers. The sequence with which the landing and car photo relays PL and PC are deenergized determines whether or not the direction sensing relay PH remains energized or is deenergized as a passenger enters or leaves. Assuming first that a passenger is entering the car, the radiant energy beam 919 is interrupted first thereby deenergizing the landing photo relay PL. This relay, by opening its contacts in line 282, deenergizes the direction sensing relay PH so that it drops out and opens its contacts in lines 283 and 284. Therefore, when the passenger interrupts the car radiant energy beam 918 and drops out the car photo relay PC, the opening of its contacts PC in line 282 and closure of its contacts in line 284 has no effect on the direction sensing relay PH. Thus, this relay when in deenergized condition indicates that the passenger entered the elevator car. The direction sensing relay PH is reenergized the instant both photo relays PC and PL are simultaneously energized.

If the passenger is leaving the car the sequence of breaking the radiant energy beams 918 and 919 is reversed so that the car photo relay PC in line 280 is deenergized first followed in order by the deenergization of the landing photo relay PL in line 281. When the car photo relay PC drops out it opens its contacts PC in line 282 and closes its contacts PC in line 284. Since a moment earlier both photo relays were energized the direction sensing relay PH was also energized so as to close its contacts in lines 283 and 284. Therefore, the opening of the car photo contacts PC in line 282 has no effect since they are bypassed by the now closed contacts PH in line 283. Furthermore, closure of the car photo relay contacts PC in line 284 completes a sealing circuit through the direction sensing relay contacts PH in line 284 to maintain the direction sensing relay PH energized. The subsequent operation of the landing photo relay PL, by opening its contacts PL in line 286, deenergizes the landing auxiliary photo relay PLA so that it closes its contacts in line 285 to maintain the sealing circuit to the direction sensing relay PH when the car photo relay PC is reenergized as the passenger clears the beam 918.

Once this condition is established with the direction sensing relay energized through the circuit in line 284 it cannot be deenergized until both the car and landing photo relays PC and PL have been simultaneously energized to open the car photo relay contacts PC in line 284 and the auxiliary landing photo relay contacts PLA in line 285. The timing of the relays as a passenger leaves the car is not critical. However, there is one critical condition in the sequence for a passenger entering the car. This critical condition occurs at the moment the passenger interrupts the landing photo beam 919 deenergizing the landing photo relay PL. Since this relay opens its contacts in lines 282 and 286 simultaneously and since the direction sensing relay PH contacts are closed in line 284 it is necessary, if the direction sensing relay PH is to be deenergized, that the direction sensing relay PH operate faster than the landing auxiliary photo relay PLA in line 286. If the latter relay were to operate more rapidly it would close its contacts PLA in line 285 thus completing a sealing circuit to the direction sensing relay PH before that relay could open its contacts PH in line 284. To avoid this possibility the landing photo relay PLA is arranged to have a slower dropout time, which for example, may be accomplished by special coil design or merely providing a resistance-capacity circuit in parallel with the operating coil so as to maintain the energization for a brief moment after the contacts PL, in line 286, open.

In one form of counting circuit employed in the control of the elevators a charging circuit to a condenser is completed for a fixed interval of time for each passenger that enters or leaves the car regardless of the length of time taken by the passenger to complete such entry or exit. In this circuit it is also desirable to prevent false operation such as false counts by a person waving his hand across the radiant energy beam 918 so as to produce a number of interruptions simulating passenger transfers. To guard against this last type of interference, circuits are provided so that the radiant energy beam must be broken for a certain length of time, somewhat less than the normal interruption time as a passenger enters or leaves, before the counting circuits respond to such interruption. This is accomplished by the relays shown in lines 287 and 288 of FIG. XI. In line 287 a car photo timing relay PCT1 is energized through car photo relay contacts PC as long as the car photorelay is energized. When this beam is interrupted to deenergize the circuit the timing relay PCT1, of the flux decay variety, remains in its closed position for a prescribed length of time. Thus the circuit must be broken for this interval of time before any further response is produced. The timing relay PCT1 in line 287, when energized, closes its contacts in line 288 to energize a second car photo timing relay PCT. Counting circuits may then employ a series circuit including a normally closed set of contacts PCT1 of the first car photo timing relay PCT1 and a normally open set of contacts PCT of the second timing relay PCT. The circuit is completed through these contacts as long as the first timing relay PCT1 in line 287 has dropped out and until the second of the relays drops out. The circuit is thus controlled in time by the second timing relay PCT. Various embodiments of such counting circuits are described in detail in copending application Serial No. 718,016, filed February 27, 1958, entitled "Elevator Controls Based on Number of Passenger Transfers," by Raymond A. Burgy, assigned to the same assignee as the present invention.

Referring to FIG. X there is shown an additional computer element designated generally at 960. Both stop time at the basement floor as measured by the closure of basement stop time relay MBR and the passage of passengers through the lightbeam at the basement floor as sensed by the contacts PCT and PCT1 is fed into the computer unit. The MBR contact shown individually for each car at line 271 is closed when its respective car is at the basement landing. If the car is still in group service so that the GSB contact at line 123 is closed energizing relay MBR at line 123 through the selector contact 644 by the brush 645. Assuming that the car is operating with the first floor as the lower dispatching terminal, the computer unit 960 of FIG. X will function in the same manner as the computer or integrator 853 of FIG. XII and will measure the stop time of a car at the basement floor by the closure of the MBR contacts in line 271 as well as the passenger count of passengers entering or leaving that car by the series counting circuit utilizing the car photo timing relay contacts PCT and PCT1 in lines 272 and 273 as described hereinbefore.

Whenever a predetermined level of stop time is reached and the basement is established as the lower terminal, the opening of the BDC back contacts prevent further measurement of stop time at the basement since all cars now travel to the basement and such stop time is no longer properly a factor to be introduced. Once a shift to the basement as the dispatching terminal is accomplished, the basement is maintained as a dispatching terminal through the passenger count circuits alone, i.e., the PCT and PCT1 contacts series counting circuit at lines 272 and 273.

The basement stop time relay MBR at line 123 of FIG. V is energized whenever any (by closure of GSB contacts) car in group service travels to the basement through the GSB contacts which close at line 123. The advance motor auxiliary relay AMR with closed contacts shown at line 115 of FIG. V permits relay MBR to be energized when the car picks up a slowdown for the basement, and opens again to drop relay MBR out as the car starts up from the basement, permitting relay MBR to be energized for the same length of time as the intermediate floor stop time relay MGF in the previously described stop-time computer 853 of FIG. XII. The selector contact, 645 shown at line 122 of FIG. V, which is energized to operate relay MBR, must also control the reversal at the terminal floor. The group service relay back contact GSB at line 126 is shown to restore the circuit between this contact and the car direction throw-over relay RL so that the normal reversal circuits will be maintained when the car is not on group service. When the car is on group service, the MBR contact at line 124 closes when the car is at the basement and causes reversal at the basement terminal floor.

As a part of the basement computer unit 960 shown in FIG. X there are shown basement stop time relays B1 and B2 at lines 274 and 275. Relay B2 at line 274 is to be adjusted to pull in when the computer 960 totalizes sufficient stop time and passenger count to warrant a transfer in terminals from the first to the basement floors. Relay B1 at 275 is designed to pull in somewhat below this value. Relay B1 is advantageously adjusted to drop out at a value where the traffic has fallen off to warrant a transfer back from the basement to the first floor as the dispatching terminal. The same result may be obtained by adjusting a single relay to pull in at the value desired for shift of terminals to the basement and the same relay could also be adjusted for a drop out value determined as the level desired for transfer of terminals back to the first floor.

Auxiliary relays B1A and B2A for relays B1 and B2 are shown at lines 229 and 230 of FIG. VIII. These relays are advantageously used to provide contacts with current carrying capacity at the voltage required to operate standard relays. A B2A contact at line 227 will operate dispatching shift relays BDC and BDCA at lines 227 and 228 when the system is not operating on the night program, the H4 contacts in line 227 being closed. It is assumed that there may be occasions during the intermittent program operation at night when building maintenance personnel might hold a car at the basement for an undue length of time and that under these circumstances no shift in dispatching terminal would be desired. Once relays BDC and BDCA are energized, the BDCA open contact at line 228 provides a holding circuit through the now closed B1A contact at line 228 which would cause the BDC and BDCA relays to be held in until the service requirements at the basement are reduced to the point where a shift in dispatching terminal back to the first floor is warranted. Such reduction in service requirement causes the drop out of relay B1, thus relay B1A, and the opening of contacts B1A at line 228.

Relay BDCA contacts at lines 225 and 226 operate a dispatch throwover switch DTO which alters the operation of the system in the following manner. A DTO back contact at line 124 of FIG. V opens to disconnect the circuits that normally cause reversal of the car at the first floor. This reversal is necessary under the conditions that there is no basement service required, the BS contacts being closed at line 124, and the first floor is the lower dispatching terminal. A DTO back contact at line 215 of FIG. VIII opens to disconnect the basement service relay BU so that this relay is not operated when the basement is the lower dispatching terminal. A DTO back contact at line 56 of FIG. IV disconnects the circuits which would cause the car to stop automatically at the first floor when the car is traveling up from the basement and when coming down from the upper floors. The car button contact BC1 allows the car to be stopped at the first floor if there is a car call. The combination of normally closed DTO and bottom dispatching floor relay MG contacts shown in the basement service relays BS1 and BS2 coil circuits at lines 65 and 66 of FIG. IV prevents the operation of the BS1 and BS2 relays when the car is at the basement and the basement is the dispatching terminal. Should these relays be energized because of the operation of the basement button when the car is at the basement the cars could not be dispatched from the terminal because the BS1 and BS2 back contacts in the "up next car" and "up load car" circuits (not shown) would be open preventing their operation in dispatching the car.

The DTO contacts shown at lines 245 to 256 of FIG. IX alter the operation of the down lantern 730 and the "this car up" 719 sign at the first floor and the lantern 727 at the basement floor. When the basement becomes the dispatching terminal the "this car up" sign 719 and down lantern 730 at the first floor operate in the same manner as hall lanterns at any of the other intermediate upper floors through the closed DTO contacts at lines 245 and 254, respectively. The contact DTO at line 247 opens to prevent the "this car up" signal from MGA and CULB from being applied to sign 719. The DTO contact at line 256 opens to disconnect the action of the CULX and CUNB contacts at that line. The up lantern 727 at the basement is altered so that it operates in a manner similar to the way the "this car up" sign 719 at the first did operate when the first floor was the dispatching terminal through the opening of the DTO contacts at line 248 and the closure of DTO contacts at line 249. The MGA and CULB contacts now operate lanterns 727 as "this car up" signals. The DTO contacts shown at 193 of FIG. VII open to prevent the basement run relay BR at line 193 from operating when the basement is the lower dispatching terminal. Further, up car run relay BUR is shifted to operate as the car runs up from the basement instead of when the car runs up from the first floor, by the closure of the DTO contacts at line 189 and the energization of selector contact 661 and the opening of DTO contacts at lines 188. Bottom dispatching floor relays MG, MGA and MGX are reconnected by the closure of DTO contacts at line 191 and the opening of DTO contacts at line 190 to operate when the car is at the basement rather than at the first floor.

Contacts of relays S1U and S1D are shown in lines 158 and 162 respectively of FIG. VI. These are shown wired to contacts on the selectors of the respective cars so that the car advantageously stops in response to first floor hall call signals when the basement is the dispatching terminal. Additional contacts of S1U and S1D are shown in the high call circuits at lines 182 and 183 of FIG. VII. These contacts set up the circuits for high call reversal at the first floor when the basement is the lower dispatching terminal. In addition, these contacts S1U and S1D cause the operation of relay SS at line 181 to indicate a call registered which would be necessary to cause a dispatch of the cars from the basement in response to such calls. The S1U and S1D contacts at lines 182 and 183 are shown bypassed by a DTO at line 181 contact so that they are effective only under the condition that the basement is the lower dispatching terminal.

Although the embodiment of the teachings of this invention shows only the transfer of a dispatching terminal from a first floor to a basement landing it is to be understood that the teachings of this invention might equally well be applied to the transfer of either the upper or lower dispatching terminal to other floors when service requirements so demand. Further, it is to be noted that the measurements of stop time and/or the number of passenger transfers or passenger transfer times could be utilized to provide a measurement of service requirements at two or more floors with selective means responsive to the measurement at each floor for selecting as a dispatching floor the floor with the greatest service requirement. Selective means responsive to a signal with the greatest magnitude from a plurality of signals are well known in the art. Thus it is not deemed necessary to illustrate said selective means in the drawings since the invention teaches the selection of a floor with a larger magnitude of service requirement over another floor. Said selective means also obviously could transfer the dispatching terminal to a second landing as the burden of service requirements shifts to said second landing. This is taught herein since the dispatching terminal shifts back to the first floor where the burden of service requirements of an elevator system ordinarily fall but for the exceptions enumerated hereinbefore.

It is to be appreciated that no invention disclosed herein is to be interpreted as limited to the specific form of elevator system illustrated and that the present disclosure is to be read as illustrative of but one utilization of the invention and not in a limiting sense.

Having described the invention, we claim:

1. An elevator system comprising a car and a plurality of landings; means adapted to dispatch said car from one of said plurality of landings; means measuring the service requirement at another of said plurality of landings; and control means, responsive to said measuring means, operative to transfer the dispatching of said car from said one landing to said other landing in response to a predetermined service requirement at said other landing.

2. An elevator system comprising a car, a plurality of landings, means for dispatching said car from a first of said landings, means measuring the service requirement at a second of said landings, and control means responsive to said means measuring said service requirement, said control means being operative to transfer the dispatching of said car from said first landing to said second landing in response to a predetermined level of said service requirement at said second landing.

3. An elevator system comprising a car, a plurality of landings, means for dispatching said car from a first of said landings, means measuring the stop time of said car at a second of said landings, and control means responsive to said means measuring said stop time of said car, said control means being operative to transfer the dispatching of said car from said first landing to said second landing in response to a predetermined level of said stop time of said car at said second landing.

4. An elevator system comprising a car, a plurality of landings, means for dispatching said car from a first of said landings, means measuring the passenger transfers at a second of said landings, and control means responsive to said means measuring said passenger transfers, said control means being operative to transfer the dispatching of said car from said first landing to said second landing in response to a predetermined level of said passenger transfers at said second landing.

5. An elevator system comprising a car, a plurality of landings, means for dispatching said car from a first of said landings, means measuring the passenger transfers and stop time of said car at a second of said landings, and control means responsive to said means measuring said passenger transfers and stop time of said car, said control means being operative to transfer the dispatching of said car from said first landing to said second landing in response to a predetermined level of said passenger transfers and stop time of said car at said second landing.

6. An elevator system comprising a car, a plurality of landings, means for dispatching said car from a first of said landings, means measuring the service requirement at a second of said landings, and control means responsive to said means measuring said service requirement, said control means being operative to transfer the dispatching of said car from said first landing to said second landing in response to a predetermined level of said service requirement at said second landing, said control means being further operative to transfer the dispatching of said car from said second landing back to said first landing in response to a second predetermined level of service requirement.

7. An elevator system according to claim 6 wherein said first-mentioned predetermined lever of service requirement is equal to said second predeterminel level of service requirement.

8. An elevator system comprising a car, a plurality of landings, means for dispatching said car from a first of said landings, means measuring the passenger transfers and stop time of said car at a second of said landings, and control means responsive to said means measuring said passenger transfers and stop time of said car, said control means being operative to transfer the dispatching of said car from said first landing to said second landing in response to a predetermined level of said passenger transfers and stop time of said car at said second landing, said control means being further operative to transfer the dispatching of said car from said second landing back to said first landing only in response to a predetermined level of passenger transfers.

9. An elevator system comprising a car, a plurality of landings, means for dispatching said car from a first of said landings, means measuring the passenger transfers and stop time of said car at a second of said landings, and control means responsive to said means measuring said passenger transfers and stop time of said car, said control means being operative to transfer the dispatching of said car from said first landing to said second landing in response to a predetermined level of said passenger transfers and stop time of said car at said second landing, said control means being further operative to transfer the dispatching of said car from said second landing back to said first landing only in responsed to a predetermined level of stop time of said car at said second landing.

10. In an elevator system comprising a car and a plurality of landings; means for measuring the service requirements of at least two of said plurality of landings; means for selecting the landing having the largest service requirements; and control means responsive to said selecting means for establishing said landing having the largest service requirement as a dispatching terminal for said elevator system.

11. In an elevator system comprising a car and a plurality of landings; means for measuring the service requirements of at least two of said plurality of landings; means for selecting the landing having the largest service requirements; and control means responsive to said selecting means for establishing said landing having the largest service requirement as a dispatching terminal for said elevator system; said selecting means being further operative to transfer said dispatching terminal to a second landing as the burden of said service requirements shifts to said second landing.

12. An elevator system comprising a plurality of cars, a plurality of landings, one of said landings being designated a terminal landing, means for dispatching said cars from said terminal landing, means for measuring the service requirement at a landing other than said terminal landing, and control means responsive to said measured service requirement adapted to transfer the dispatching of said cars from said terminal landing to said other landing at a predetermined lever of service requirement at said other landing, said means for measuring the service requirement at said other landing including a computer adapted to sum the total stop time of said cars at said other landing.

13. An elevator system comprising a plurality of cars, a plurality of landings, one of said landings being designated a terminal landing, means for dispatching said cars from said terminal landing, means for measuring the service requirement at a landing other than said terminal landing, and control means responsive to said measured service requirement adapted to transfer the dispatching of said cars from said terminal landing to said other landing at a predetermined level of service requirement at said other landing, said means for measuring said service requirements including a computer responsive to the stop time of said cars and the number of passenger transfers at said other landing.

14. An elevator system comprising a plurality of cars, a plurality of landings, one of said landings being designated a terminal landing, means for dispatching said cars from said terminal landing, means for measuring the service requirement at a landing other than said terminal landing, and control means responsive to said measured service requirement adapted to transfer the dispatching of said cars from said terminal landing to said other landing at a predetermined level of service requirement at said other landing, said means for measuring the service requirement at said other landing including a computer responsive to the number of passenger transfers at said other landing.

15. An elevator system comprising a plurality of cars, a plurality of landings, one of said landings being designated a terminal landing, means for dispatching said cars from said terminal landing, means for measuring the service requirement at a landing other than said terminal landing, and control means responsive to said measured service requirement adapted to transfer the dispatching of said cars from said terminal landing to said other landing at a predetermined level of service requirement at said other landing, said means for measuring the service requirement at said other landing including a computer adapted to sum the total stop time of said cars at said other landing, said control means being further operative to transfer the dispatching of said cars back to said terminal landing in response to a predetermined level of passenger transfers at said other landing.

16. An elevator system comprising a car, a plurality of landings, means for dispatching said car from a first of said landings, means measuring the service requirement at a second of said landings, and control means responsive to said means measuring said service requirement, said control means being operative to transfer the dispatching of said car from said first landing to said second landing in response to a predetermined level of said service requirement at said second landing, said control means being further operative to transfer the dispatching of said car from said second landing back to said first landing in response to a diminished second predetermined level of service requirement at said second landing.

17. An elevator system comprising a car, a plurality of landings, means for dispatching said car from a first of said landings, means measuring the passenger transfers and stop time of said car at a second of said landings, and control means responsive to said means measuring said passenger transfers and stop time of said car, said control means being operative to transfer the dispatching of said car from said first landing to said second landing in response to a predetermined level of said passenger transfers and stop time of said car at said second landing, said control means being further operative to transfer the dispatching of said car from said second landing back to said first landing only in response to a diminished predetermined level of passenger transfers at said second landing.

18. An elevator system comprising a car, a plurality of landings, means for dispatching said car from a first of said landings, means measuring the passenger transfers and stop time of said car at a second of said landings, and control means responsive to said means measuring said passenger transfers and stop time of said car, said control means being operative to transfer the dispatching of said car from said first landing to said second landing in response to a predetermined level of said passenger transfers and stop time of said car at said second landing, said control means being further operative to transfer the dispatching of said car from said second landing back to said first landing only in response to a diminished predetermined level of stop time of said car at said second landing.

19. An elevator system comprising a plurality of cars, a plurality of landings, one of said landings being designated a terminal landing, means for dispatching said cars from said terminal landing, means for measuring the service requirement at a landing other than said terminal landing, and control means responsive to said measured service requirement adapted to transfer the dispatching of said cars from said terminal landing to said other landing at a predetermined level of service requirement at said other landing, said means for measuring said service requirements including a computer responsive to the stop time of said cars and passenger transfers at said other landing.

20. An elevator system comprising a plurality of cars, a plurality of landings, one of said landings being designated a terminal landing, means for dispatching said cars from said terminal landing, means for measuring the service requirement at a landing other than said terminal landing, and control means responsive to said measured service requirement adapted to transfer the dispatching of said cars from said terminal landing to said other landing at a predetermined level of service requirement at said other landing, said means for measuring the service requirement at said other landing including a computer responsive to passenger transfers at said other landing.

21. An elevator system comprising a car, a plurality of landings, means for dispatching said car from a first of said landings in a first direction, means for shifting said dispatching terminal to a second landing in a second direction from said first landing in response to a predetermined level of service requirement sensed in said second direction.

22. An elevator system comprising a car, a plurality of landings, means for dispatching said car from a first of said landings in a first direction, means for shifting said dispatching terminal to a second landing in a second direction from said first landing in response to a predetermined level of service requirement sensed at a landing in said second direction.

23. An elevator system comprising a car, a plurality of landings, means for dispatching said car from a first of said landings in a first direction, means for shifting said dispatching terminal to a second landing in a second direction from said first landing in response to a predetermined level of service requirement sensed in said second direction, means for transferring said dispatching terminal back to said first landing in response to a predetermined diminished level of said sensed service requirement.

24. An elevator system comprising a car, a plurality of landings, means for dispatching said car from a first of said landings in a first direction, means for shifting said dispatching terminal to a second landing in a second direction from said first landing in response to a predetermined level of service requirement sensed at a landing in said second direction, means for transferring said dispatching terminal back to said first landing in response to a predetermined diminished level of said sensed service requirement at said second landing.

25. An elevator system comprising a car, a plurality of landings, means for dispatching said car from a first of said landings in a first direction, means measuring the service requirements at a second landing in a second direction from said first landing, and control means responsive to said means measuring said service requirement, said control means being operative to transfer the dispatching of said car from said first landing to said second landing in response to a predetermined level of service requirement.

26. An elevator system comprising a car, a plurality of landings, means for dispatching said car from a first of said landings in a first direction, means measuring the service requirements at a second landing in a second direction from said first landing, and control means responsive to said means measuring said service requirement, said control means being operative to transfer the dispatching of said car from said first landing to said second landing in response to a predetermined level of service requirement, said control means being further operative to transfer the dispatching of said car back to said first landing in response to a predetermined diminished level of service requirement at said second landing.

27. An elevator system comprising a car, a plurality of landings, means for dispatching said car from a first of said landings in a first direction, means measuring the service requirements at a second landing in a second direction from said first landing including means measuring the stop time of said car at said second landing, and control means responsive to said means measuring said service requirement, said control means being operative to transfer the dispatching of said car from said first landing to said second landing in response to a predetermined level of service requirement.

28. An elevator system comprising a car, a plurality of landings, means for dispatching said car from a first of said landings in a first direction, means measuring the service requirements at a second landing in a second direction from said first landing including means measuring the number of passenger transfers at said second landing, and control means responsive to said means measuring said service requirement, said control means being operative to transfer the dispatching of said car from said first landing to said second landing in response to a predetermined level of service requirement.

29. An elevator system comprising a car, a plurality of landings, means for dispatching said car from a first of said landings in a first direction, means measuring the service requirements at a second landing in a second direction from said first landing including means measuring passenger transfers and the stop time of said car at said second landing, and control means responsive to said means measuring said service requirement, said control means being operative to transfer the dispatching of said car from said first landing to said second landing in response to a predetermined level of service requirement.

30. An elevator system comprising a car, a plurality of landings, means for dispatching said car from a first of said landings in a first direction, means measuring the service requirements at a second landing in a second direction from said first landing including means measuring passenger transfers and the stop time of said car at said second landing, and control means responsive to said means measuring said service requirement, said control means being operative to transfer the dispatching of said car from said first landing to said second landing in response to a predetermined level of service requirement, said control means being further operative to transfer the dispatching of said car back to said first landing in response only to a diminished level of passenger transfers at said second landing.

31. In an elevator system comprising a car and a plurality of landings; means for dispatching said car from a first of said landings; control means, responsive to service requirements at another of said plurality of landings, operative to shift the dispatching of said car from said first landing to said second landing when said service requirements at said second landing attains a predetermined level.

References Cited in the file of this patent
UNITED STATES PATENTS
2,740,496    Santini et al. _____ Apr. 3, 1956

UNITED STATES PATENT OFFICE
CERTIFICATE OF CORRECTION

Patent No. 3,065,824                                        November 27, 1962

Raymond A. Burgy et al.

It is hereby certified that error appears in the above numbered patent requiring correction and that the said Letters Patent should read as corrected below.

Column 6, line 48, for "parallel" read -- paralleled --; column 11, line 17, for "contats" read -- contacts --; column 12, line 42, for "cart" read -- car --; column 18, line 47, for "seletcor" read -- selector --; line 71, for "as" read -- at --; column 21, lines 12 and 13, for "complete" read -- completed --; column 28, line 23, for "minitor" read -- monitor --; column 29, line 6, for "intervls" read -- intervals --; line 29, for "relay" read -- relays --; column 30, line 62, for "1950" read -- 1959 --; column 35, line 31, for "BC1" read -- CB1 --; column 37, line 36, for "lever" read -- level --; line 65, for "responsed" read -- response --; column 38, line 19, for "lever" read -- level --.

Signed and sealed this 12th day of May 1964.

(SEAL)
Attest:

ERNEST W. SWIDER                                    EDWARD J. BRENNER
Attesting Officer                                  Commissioner of Patents